(12) United States Patent
Dorogusker et al.

(10) Patent No.: US 8,938,217 B2
(45) Date of Patent: Jan. 20, 2015

(54) COMMUNICATING AND STORING INFORMATION ASSOCIATED WITH MEDIA BROADCASTS

(75) Inventors: Jesse Lee Dorogusker, Menlo Park, CA (US); Emily Clark Schubert, Los Altos, CA (US); Donald J. Novotney, San Jose, CA (US); Anthony M. Fadell, Portola Valley, CA (US); Michael Benjamin Hailey, Campbell, CA (US); Chris Bell, Pacifica, CA (US); Steve Saro Gedikian, Cupertino, CA (US); Robert Edward Borchers, Pleasanton, CA (US); Jay Laefer, Sunnyvale, CA (US); Gregory Thomas Lydon, Santa Cruz, CA (US); Lawrence G. Bolton, Fremont, CA (US); Eric Oliver, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1423 days.

(21) Appl. No.: 11/961,904

(22) Filed: Dec. 20, 2007

(65) Prior Publication Data
US 2008/0188209 A1 Aug. 7, 2008

Related U.S. Application Data

(60) Provisional application No. 60/957,648, filed on Aug. 23, 2007, provisional application No. 60/916,766, filed on May 8, 2007, provisional application No. 60/923,439, filed on Apr. 12, 2007, provisional application No. 60/876,857, filed on Dec. 22, 2006.

(51) Int. Cl.
*H04M 3/42* (2006.01)
*H04H 60/27* (2008.01)
(Continued)

(52) U.S. Cl.
CPC .......... *H04H 60/27* (2013.01); *G06Q 30/0241* (2013.01); *H04H 60/64* (2013.01); *H04W 4/185* (2013.01); *H04H 60/37* (2013.01); *H04H 60/73* (2013.01)
USPC ....................................... 455/414.1; 455/420

(58) Field of Classification Search
USPC ............... 455/3.06, 412.1, 414.1–414.4, 420, 455/556.1, 569.1; 379/67.1, 88.1; 705/14.49–14.66
See application file for complete search history.

(56) References Cited

U.S. PATENT DOCUMENTS

| 4,977,455 A | 12/1990 | Young |
| 5,303,393 A | 4/1994 | Noreen et al. |

(Continued)

FOREIGN PATENT DOCUMENTS

| EP | 1220479 A2 | 7/2002 |
| EP | 1367734 A1 | 12/2003 |

(Continued)

OTHER PUBLICATIONS

International Search Report PCT/US2007/088453 dated Dec. 12, 2008.

(Continued)

*Primary Examiner* — George Eng
*Assistant Examiner* — Marcus Hammonds
(74) *Attorney, Agent, or Firm* — Kilpatrick Townsend & Stockton LLP

(57) ABSTRACT

An accessory communicates with a portable media device ("PMD") to store tags associated with broadcasts in a file maintained in a storage medium of the accessory, where the tags contain information descriptive of a subset of the broadcast content. In one embodiment, the accessory sends commands to the PMD to create or open a tag file that resides on the PMD, write one or more tags to the file, and close the file. Stored tags can be used to access (e.g., purchase) tagged content by communicating with a media asset delivery service either via a host computer or directly from the PMD.

31 Claims, 18 Drawing Sheets

(51) Int. Cl.
*G06Q 30/02* (2012.01)
*H04H 60/64* (2008.01)
*H04W 4/18* (2009.01)
*H04H 60/37* (2008.01)
*H04H 60/73* (2008.01)

(56) References Cited

U.S. PATENT DOCUMENTS

| | | |
|---|---|---|
| 6,230,205 B1 | 5/2001 | Garrity et al. |
| 6,342,926 B1 | 1/2002 | Hanafee et al. |
| 6,463,469 B1 | 10/2002 | Yavitz |
| 6,473,792 B1 | 10/2002 | Yavitz et al. |
| 6,505,160 B1 | 1/2003 | Levy et al. |
| 6,578,047 B1 | 6/2003 | Deguchi |
| 6,604,072 B2 | 8/2003 | Pitman et al. |
| 6,650,877 B1 | 11/2003 | Tarbouriech et al. |
| 6,674,993 B1 | 1/2004 | Tarbouriech |
| 6,701,060 B2 | 3/2004 | Yuen et al. |
| 6,748,360 B2 | 6/2004 | Pitman et al. |
| 6,941,275 B1 | 9/2005 | Swierczek |
| 6,972,698 B2 | 12/2005 | Deguchi |
| 6,990,453 B2 | 1/2006 | Wang et al. |
| 7,062,528 B2 | 6/2006 | Deguchi |
| 7,124,125 B2 | 10/2006 | Cook et al. |
| 7,127,154 B2 | 10/2006 | Son et al. |
| 7,158,753 B2 | 1/2007 | Kagan et al. |
| 7,187,947 B1 | 3/2007 | White et al. |
| 7,283,973 B1 | 10/2007 | Loghmani et al. |
| 7,343,141 B2 | 3/2008 | Ellis et al. |
| 7,613,380 B2 | 11/2009 | Yanagita |
| 7,634,605 B2 | 12/2009 | Laeter et al. |
| 8,458,184 B2 | 6/2013 | Dorogusker et al. |
| 2001/0031066 A1* | 10/2001 | Meyer et al. .............. 382/100 |
| 2002/0010759 A1 | 1/2002 | Hitson et al. |
| 2002/0012525 A1 | 1/2002 | Yuen et al. |
| 2002/0102954 A1* | 8/2002 | Kaneko ..................... 455/142 |
| 2002/0132575 A1 | 9/2002 | Kesling et al. |
| 2002/0151327 A1 | 10/2002 | Levitt |
| 2002/0152874 A1 | 10/2002 | Vilcauskas et al. |
| 2002/0183059 A1 | 12/2002 | Noreen et al. |
| 2002/0194264 A1 | 12/2002 | Uchiyama et al. |
| 2003/0040272 A1 | 2/2003 | Lelievre et al. |
| 2003/0079038 A1* | 4/2003 | Robbin et al. ............. 709/232 |
| 2003/0151621 A1 | 8/2003 | McEvilly et al. |
| 2004/0019497 A1 | 1/2004 | Volk et al. |
| 2004/0073561 A1 | 4/2004 | Torres et al. |
| 2004/0073727 A1* | 4/2004 | Moran et al. ................ 710/74 |
| 2004/0088180 A1 | 5/2004 | Akins, III |
| 2004/0127199 A1* | 7/2004 | Kagan et al. ............. 455/414.1 |
| 2004/0186857 A1* | 9/2004 | Serlet et al. ............... 707/200 |
| 2004/0198331 A1 | 10/2004 | Coward et al. |
| 2004/0199432 A1 | 10/2004 | Iwase et al. |
| 2004/0218902 A1 | 11/2004 | Yanagita |
| 2004/0266336 A1 | 12/2004 | Patsiokas et al. |
| 2005/0020223 A1 | 1/2005 | Ellis et al. |
| 2005/0168588 A1 | 8/2005 | Fisher et al. |
| 2005/0275726 A1 | 12/2005 | Abraham et al. |
| 2006/0069749 A1 | 3/2006 | Herz et al. |
| 2006/0184538 A1 | 8/2006 | Randall et al. |
| 2006/0184719 A1* | 8/2006 | Sinclair .................... 711/103 |
| 2006/0184960 A1 | 8/2006 | Horton et al. |
| 2006/0187317 A1 | 8/2006 | Montulli et al. |
| 2006/0206582 A1* | 9/2006 | Finn ......................... 709/217 |
| 2006/0235864 A1 | 10/2006 | Hotelling et al. |
| 2007/0028006 A1 | 2/2007 | Laefer et al. |
| 2007/0281689 A1 | 12/2007 | Altman et al. |
| 2007/0291709 A1* | 12/2007 | Wassingbo et al. ......... 370/338 |
| 2008/0082523 A1 | 4/2008 | Momosaki et al. |
| 2008/0126191 A1 | 5/2008 | Schiavi |
| 2008/0162358 A1 | 7/2008 | Patsiokas et al. |
| 2008/0183757 A1* | 7/2008 | Dorogusker et al. ...... 707/104.1 |
| 2009/0034450 A1* | 2/2009 | Urner ....................... 370/328 |
| 2009/0063975 A1 | 3/2009 | Bull et al. |
| 2009/0070370 A1 | 3/2009 | Cunningham et al. |
| 2009/0100068 A1 | 4/2009 | Guaba et al. |
| 2009/0125609 A1 | 5/2009 | Wood et al. |
| 2009/0158155 A1 | 6/2009 | Quinn et al. |
| 2009/0326949 A1 | 12/2009 | Douthitt et al. |
| 2010/0121741 A1 | 5/2010 | Hotelling et al. |
| 2010/0131567 A1* | 5/2010 | Dorogusker et al. .......... 707/802 |
| 2011/0053491 A1 | 3/2011 | Bolton et al. |

FOREIGN PATENT DOCUMENTS

| | | |
|---|---|---|
| EP | 1650971 A1 | 4/2006 |
| WO | WO 95/01058 A1 | 1/1995 |
| WO | WO 2005/024818 A | 3/2005 |
| WO | WO 2007/144030 A1 | 12/2007 |
| WO | WO 2008/074968 A1 | 6/2008 |
| WO | WO 2008/080006 A2 | 7/2008 |

OTHER PUBLICATIONS

AT&T Wireless: mMode phones and how to access your music and ringtones [online], [retrieved on Oct. 5, 2005]. Retrived from the Internet <URL:http://www.attwireless.com/personal/features/fun/musichowto.jhtml>, pp. 1-3.

Brodia, "How to Do Everything With Your Zune," 1st Ed., Jul. 2007, pp. 71-73.

Griffin 4020TALK—iTalk Voice Recorder for iPod, product description, Electronic Express [online], [retrieved on Jun. 18, 2006]. Retrieved from the Internet <URL: http://www.electronicexpress.com/product?prod_id=7464>.

Griffin—radio Shark, product information sheet, Griffin Technology, [online], [retrieved Jun. 18, 2006]. Retrieved from the Internet <URL: http://www.griffintechnology.com/products/radioshark>.

MacXM Features [online], [retrieved on Apr. 11, 2005]. Retrieved from the Internet <URL: http://macxm.sourceforge.net/features.html>, 1 page.

MacXM Screenshots [online], [retrieved on Apr. 11, 2005]. Retrieved from the Internet<URL: http://macxm.sourceforge.net/shots.html> pp. 1-2.

MacXM FAQs [online], [retrieved on Apr. 11, 2005]. Retrieved from the Internet <URL: http://macxm.sourceforge.net/faq.html>, pp. 1-6.

Menta et al., "Review: Neuros MP3 Digital Audio Computer," [online], [retrieved on May 4, 2005]. Retrieved from the Internet <URL: http://www.mp3newswire.net/stories/2003/neuros.html>.

Microsoft Zune—Ars Technica, by Nate Anderson, last updated Nov. 15, 2006, [online], six parts, 18 pages [retrieved on Mar. 23, 2009]. Retrieved from the Internet <URL: http://arstechnica.com/hardware/reviews/2006/11/zune.ars>.

Miller et al, "Audio Fingerprinting: Nearest Neighbor Search in High Dimensional Binary Spaces," IEEE Multimedia Signal Processing Workshop 2002, St. Thomas, U.S. Virgin Islands, pp. 1-4.

Neuros MP3 Digital Audio Computer [online], [retrieved Aug. 11, 2004]. Retrieved from the Internet <URL: http://www.neurosaudio.com>, pp. 1-2.

Neuros User's Guide, 2nd Edition, Neuros Audio, LLC.,Chicago, IL, pp. 1-25.

Philips Research, "Content Identification Audio Fingerprinting Technology," [online], [retreived on Sep. 29, 2004]. Retrieved from the Internet <URL: http://www.research.philips.com/initiatives/contentid/audiofp.html>, 5 pages.

RepliCheck How It Works, Audible Magic Corporation [online], [retrieved on Sep. 29, 2004]. Retrieved on the Internet <URL: http://www.replicheck.com/how_it_works.html>, pp. 1-4.

Schwarz, SchwarzTech Review: Griffin iTalk [online], [retreived on Jun. 18, 2006]. Retrieved from the Internet <URL: http://schwarztech.us/reviews/italk.shtml>.

Shazam Technology, Shazam Entertainment Ltd. [online], [retrieved Sep. 29, 2004]. Retrieved from the Internet <URL: http://www.shazamentertainment.com/technology.shtml>, 2 pages.

Shazam Mobile Products & Services, Shazam Entertainment Ltd. [online], [retrieved Sep. 29, 2004]. Retrieved from the Internet <URL: http://www.shazamentertainment.com/products.shtml>, 2 pages.

(56) References Cited

OTHER PUBLICATIONS

Sony device bookmarks music heard on radio—CNET News, by Ian Fried, dated Jun. 9, 2000, [online], [retrieved Mar. 19, 2009]. Retrieved from the Internet <URL: http://news.cnet.corn/2100-1040-241675.html>.

UBC Media Group—Radio Stations News, dated Dec. 13, 2007, [online], [retrieved on Mar. 19, 2009]. Retrieved on the Internet <URL: http://www.ubcmedia.com/pressview.php?ID=157>.

UBC Media Group—Group News, dated Jun. 25, 2007, [online], [retrieved on Mar. 19, 2009]. Retrieved on the Internet <URL: http://www.ubcmedia.com/pressview.php?ID=110>.

International Search Report PCT/US2007/088425 dated Sep. 22, 2008.

International Search Report PCT/US2007/088453 dated Oct. 6, 2008.

Examiner's First Report dated May 31, 2010 for Australian Patent Application No. 2007336816, 2 pages.

First Office Action dated May 27, 2010 for Chinese Patent Application No. 200780047063.0, 21 pages.

Examination Report under Section 18(3) dated Jul. 1, 2010 for Great Britain Application No. GB0911578.3, 3 pages.

Non-Final Office Action, Mail date Jan. 4, 2011; U.S. Appl. No. 12/693,943, 9 pages.

Front page of Chicago Bulls website, http://nba.com/bulls/, as of Nov. 8, 2006 captured through Wayback Machine on Dec. 16, 2010; http://web.archive.org/web/20061108221003/http://www.nba.com/bulls/ , 1 page.

First Office Action dated Jan. 18, 2011 for Chinese Patent Application No., (In Chinese Only), 4 pages.

Office Action and Search Report dated May 11, 2011 for Taiwan Intellectual Property Office (IPO), TW Application No. 096149601, (In Chinese Only), 5 pages.

European Patent Office, Examination Report dated Jun. 20, 2011 for EPO Application No. 07 869 685.3, 4 pages.

Non-Final Office Action of Oct. 14, 2011 for U.S. Appl. No. 11/961,127, 12 pages.

Final Office Action of Aug. 24, 2010 for U.S. Appl. No. 11/961,127, 15 pages.

Non-Final Office Action of Apr. 5, 2010 for U.S. Appl. No. 11/961,127, 22 pages.

Examination Report under Section 18(3) for Great Britain Patent Application GB0909613.2, dated Feb. 18, 2010, 4 pages.

European Search Report for European Application No. 09 164 888.1, mailed on Feb. 10, 2012, 6 pages.

Non-Final Office Action for U.S. Appl. No. 11/961,127, mailed Apr. 6, 2012, 14 pages.

Final Office Action for U.S. Appl. No. 11/961,127, mailed Aug. 23, 2012, 16 pages.

Notice of Acceptance for Australian Patent Application No. 2007336816, dated May 13, 2011, 3 pages.

Examination Report under Section 18(3) for Great Britain Patent Application GB0909123.2, dated Dec. 6, 2010, 2 pages.

Notice of Acceptance for Great Britain Patent Application No. GB0909123.2, dated Jul. 19, 2011, 2 pages.

Examiner's First Report dated Mar. 9, 2011 for Australian Patent Application No. 2007336832, 2 pages.

Examiner's Second Report dated Feb. 29, 2012 for Australian Patent Application No. 2007336832, 2 pages.

Notice of Acceptance for Australian Patent Application No. 2007336832, dated May 9, 2012, 3 pages.

Second Office Action dated Dec. 31, 2011 for Chinese Patent Application No. 200780047063.0, 11 pages.

Notice of Acceptance for Great Britain Patent Application No. GB0909613.2, dated Jan. 1, 2011, 2 pages.

Office Action for Taiwan Patent Application No. 096149601, dated May 11, 2011, 5 pages.

Third Office Action Dated Sep. 4, 2012 for 2011 for Chinese Patent Application No. 200780047063.0, 21 pages.

\* cited by examiner

| Name | Type | Description |
| --- | --- | --- |
| Name | string | Name (title) of the track |
| Artist | string | Name of the artist |
| Album | string | Name (title) of the album |
| TimeStamp | date | Date and time track was tagged |
| TrackIdentifier | Integer, string | Unique identifier assigned to track by relevant authority |
| Country | string | 2-letter ISO country code for the country where broadcast source is located |
| StationFrequency | string | Operating frequency of the station (source of the broadcast) |
| CallLetters | string | Call letters for the station |
| DMA | string | Dominant market area of the station |
| Network | string | Network or group with which the broadcast source is affiliated |
| TimeLockStatus | integer | Broadcast source's time lock status |
| StreamID | integer | Broadcast source's stream identifier |
| URL | string | URL associated with broadcast source |
| AffiliateID | integer | Unique identifier of the broadcast source assigned by media asset management/download service |
| PodcastFeedURL | string | URL for a podcast associated with the program |
| ProgramType | string | The program type |
| AmbiguousTrack | integer | Boolean value indicating whether ambiguity exists as to which track was tagged |
| ButtonPressed | integer | For tags with AmbiguousTrack, indicates whether the track was actually playing when the tag was requested |

FIG. 2

| Information Type | EPF | HD Radio PSD | HD Radio SIS | HD Radio SIG | RDS | Satellite PAD |
|---|---|---|---|---|---|---|
| STATION INFORMATION | | | | | | |
| Frequency | | NA | NA | | | |
| HD Station | | NA | NA | | | |
| Station Name | | | ✓ | | ✓ | ✓ |
| Station Genre | | ✓ | | | | |
| Call Letters | | | ✓ | | | |
| Station Tagline | | | ✓ | | | |
| Program Name | | | | ✓ | ✓ | ✓ |
| DJ Name | | NA | NA | | | |
| Station Message | | | ✓ | | | |
| Station DMA | | | ✓ | | | |
| Affiliate ID | ✓ | | | | | |
| SONG INFORMATION | | | | | | |
| Title | | ✓ | ✓ | | | ✓ |
| Artist | | ✓ | ✓ | | | ✓ |
| Album | | ✓ | ✓ | | | |
| Local Time | | | ✓ | | | |
| Local Date | | | ✓ | | | |
| MATCHING INFORMATION | | | | | | |
| ADAM_ID | | ✓ | ✓ | | | |
| UPC | | ✓ | ✓ | | | |
| ISRC | | ✓ | ✓ | | | |
| AMG Track ID | | ✓ | ✓ | | | |

FIG. 3

```
<!DOCTYPE plist PUBLIC "MFR//DTD PLIST 1.0//EN"
"http://www.apple.com/DTDs/PropertyList-1.0.dtd">
<plist version="1.0">
<dict>
    <key>MajorVersion</key>
    <integer>1</integer>
    <key>MinorVersion</key>
    <integer>1</integer>
    <key>ManufacturerID</key>
    <integer>17</integer>
    <key>ManufacturerName</key>
    <string>Acme</string>
    <key>DeviceName</key>
    <string>AC-HDR100</string>
    <key>iTunesAffiliateID</key>
    <integer>0</integer>
    <key>MarkedTracks</key>
    <array>
        <dict>
            <key>AMGTrackID</key>
            <integer>0</integer>
            <key>Album</key>
            <string>One by One</string>
            <key>Artist</key>
            <string>Foo Fighters</string>
            <key>Country</key>
            <string>US</string>
            <key>GRid</key>
            <string>A1-2425G-ABC1234002-M</string>
            <key>Name</key>
            <string>Times Like These</string>
            <key>ProgramType</key>
            <string>Music</string>
            <key>StationCallLetters</key>
            <string>KFOG</string>
            <key>StationDMA</key>
            <string>San Francisco, CA</string>
            <key>StationGroup</key>
            <string></string>
            <key>StationURL</key>
            <string>http://www.kfog.com</string>
            <key>TimeStamp</key>
            <date>2007-04-16T00:35:42Z</date>
            <key>iTunesArtistID</key>
            <string>6906197</string>
            <key>iTunesPlaylistID</key>
            <integer>6906317</integer>
            <key>iTunesSongID</key>
            <integer>6906304</integer>
        </dict>
        <dict>
            . . .
        </dict>
    </array>
</dict>
</plist>
```

FIG. 7

| Title | Artist | Album | Genre | Date | Options | | | |
|---|---|---|---|---|---|---|---|---|
| Song 1 | Artist1 | Album 1 | Rock | 4/12/2007 | Preview | Buy | List | Share | Remove |
| Song 2 | Artist2 | Album 2 | Pop | 5/22/2007 | Preview | Buy | List | Share | Remove |
| Song 3 | Artist1 | Album 3 | Rock | 12/22/2006 | Preview | Buy | List | Share | Remove |

Buy All — 1412

COMMUNICATING AND STORING INFORMATION ASSOCIATED WITH MEDIA BROADCASTS

CROSS-REFERENCES TO RELATED APPLICATIONS

The present disclosure claims the benefit of each of the following four commonly-assigned co-pending U.S. patent applications: U.S. patent application Ser. No. 11/210,172, filed Aug. 22, 2005; U.S. Patent Application No. 60/876,857, filed Dec. 22, 2006; U.S. Patent Application No. 60/923,439, filed Apr. 12, 2007; U.S. Patent Application No. 60/916,766, filed May 8, 2007; and U.S. Patent Application No. 60/957,648, filed Aug. 23, 2007, which are incorporated herein by reference in their entireties.

The present application is related to commonly-assigned U.S. patent application Ser. No. 11/961,127 (now U.S. Pat. No. 8,458,184), filed of even date herewith, the disclosure of which is incorporated herein by reference in its entirety.

BACKGROUND OF THE INVENTION

The present invention relates generally to receiving media broadcasts and in particular to systems and methods for communicating and storing information associated with broadcasts.

Users listen to or watch broadcast media in a variety of contexts. For example, it is common to listen to the radio while driving or doing chores or the like. During such listening, the user may hear a song he or she likes but might not hear or be able to remember the title of the song or the name of the artist. Or a user might see a portion of a television ("TV") broadcast that seems interesting but not catch the name of the program. Further, even when the identifying information is provided, the user might not have ready access to a pen or paper to write down the information and might not be able to remember it later. This can make it difficult for users who want to acquire interesting content to locate the content later.

In the case of music broadcasts (e.g., radio), various services have sprung up to assist users in identifying songs they hear. For example, radio stations maintain play lists indicating what songs were played when, and some services make these lists available to users. If the user knows which station he or she was listening to and the time when the song was played, the play list can be searched to identify the song. Other services identify songs from recorded segments in analog or digital formats. For example, a user with a mobile phone who hears a song playing in a shop can call a service and allow the service to "hear" a portion of the song. The service analyzes the sounds and identifies the song. Other services allow a user to send a digital recording (e.g., in MP3 format) of a segment of the song via the Internet or other digital data network; the service analyzes the digital recording and identifies the song.

These services are not always reliable. In the case of playlists, the user must remember the station identifying information (e.g., frequency or call letters) and the date and time. In the case of sample matching, the matching can be error-prone, particularly if the quality of the recording or live sound is poor.

It would therefore be desirable to provide improved techniques to facilitate communication and storing of information about broadcasts.

BRIEF SUMMARY OF THE INVENTION

In accordance with some embodiments of the present invention, a portable media device and/or an accessory coupled thereto can be used to collect and store information about broadcast content received by the portable media device and/or accessory. The collected information, referred to herein as a "tag," can encompass any type of data that facilitates identification of a particular broadcast track (e.g., a song in the case of music broadcasts, a podcast, an episode of a TV program, or the like).

In some embodiments, the portable media device can be coupled to an accessory that is capable of receiving media broadcasts. The media broadcast can include broadcast content as well as metadata identifying the content (e.g., track title) and/or the broadcaster. The accessory can capture the metadata (and/or a portion of the broadcast content itself) and provide the metadata (and/or content) as a "tag" to the portable media device, either in response to a user command or automatically.

In some embodiments, the user can connect the portable media device, e.g., via a network, to a media asset delivery service, allowing stored tags to be communicated to the media asset delivery service. The user can then interact with the media asset delivery service to sample and/or acquire (e.g., download) media content corresponding to the tags.

One aspect of the present invention relates to a method performed by an accessory communicably coupled to a portable media device ("PMD"). The accessory can receive broadcast data including a first track and determine whether the first track is to be tagged. In response to determining that the first track is to be tagged, the accessory can generate a first tag comprising identifying information for the first track and instruct the PMD to store the first tag in a storage medium of the PMD.

Another aspect of the present invention relates to a method performed by an accessory communicably coupled to a PMD. The accessory can receive broadcast data including multiple tracks and metadata associated with each of the tracks. During receiving of the broadcast data, the accessory can receive an instruction to tag a currently playing one of the tracks. In response to this instruction, the accessory can instruct the PMD to open a file on a storage device of the PMD, instruct the PMD to write to the file a first tag record containing at least a portion of the metadata associated with the currently playing track, and instruct the PMD to close the file.

Another aspect of the present invention relates to an accessory for use with a PMD. The accessory can include a receiver component, a tag extraction engine and an interface. The receiver component can be configured to receive a broadcast including one or more tracks. The tag extraction engine can be configured to capture a tag comprising information related to one of the tracks of the broadcast. The interface can be configured to communicate the captured tag from the tag extraction engine to a PMD, wherein the PMD is configured to store the tag in a storage medium.

Another aspect of the invention relates to a method performed by a PMD communicably coupled to an accessory adapted to receive broadcast data. The PMD can receive an instruction from the accessory to open a tag file in a storage medium of the PMD. In response to the instruction to open a tag file, the PMD can open the tag file and return a handle for the tag file to the accessory. The PMD can receive an instruction from the accessory to write a first tag to the tag file, where the first tag comprises identifying information for a track of broadcast data received by the accessory. In response to the instruction to write the first tag, the PMD can store the first tag in the tag file.

Another aspect of the invention relates to a method performed by a PMD. The PMD can receive a first tag comprising identifying information for a first media asset, communicate at least a portion of the identifying information from the first tag to a media asset delivery service, receive information related to the first media asset from the media asset delivery service, and present the received information to a user of the PMD.

Another aspect of the present invention relates to a PMD. The PMD can include a storage medium, a storage interface engine, and an interface. The storage medium can be adapted to store data including media assets. The storage interface engine can be communicably coupled to the storage medium and adapted to read data from and write data to the storage medium. The interface can be adapted to receive a tag comprising information related to a currently playing track of a broadcast and to instruct the storage interface to store the tag in the storage medium.

Another aspect of the present invention relates to a method of providing access to information about a media asset. A tag comprising identifying information for a first media asset can be received. At least a portion of the received identifying information can be transmitted to a media asset delivery service. In response, a reference to track-related information maintained by the media asset delivery service can be received from the media asset delivery service. An entry for the first media asset in a list of media assets can be generated, and the entry can be associated with the reference to the track-related information, the list of media assets can be displayed for a user. In response to a user input signal, the reference can be used to access the track-related information.

Another aspect of the present invention relates to a method of acquiring a media asset. A tag for the media asset can be received. The tag can include an asset identifier associated with the media asset by a media asset delivery service and an affiliate identifier, the affiliate identifier identifying a referral source that provided the unique identifier. An asset acquisition request can be sent to the media asset delivery service. The asset acquisition request can include the asset identifier and the affiliate identifier. In response to the asset acquisition request, the media asset can be received from the media asset delivery service.

Another aspect of the invention relates to a method of facilitating acquisition of a media asset. A media asset delivery service can receive a request from a client device to acquire a media asset. The request can identify the media asset by reference to a unique identifier associated with the media asset by the media asset delivery service, and the request can further include an affiliate identifier, the affiliate identifier identifying a referral source from which the client device obtained the unique identifier. In response to the request, the media asset can be transmitted to the client, and the referral source identified by the affiliate identifier can be credited.

Another aspect of the invention relates to a method of providing information about a media asset. A PMD can receive broadcast data including a track and generate a tag for the track, where the tag includes identifying information for the track. The PMD can store the tag and can also transmit the tag to a tag recipient via a network, e.g., using e-mail, short messaging service, instant messaging, or the like.

The following detailed description together with the accompanying drawings will provide a better understanding of the nature and advantages of the present invention.

BRIEF DESCRIPTION OF THE DRAWINGS

FIG. 2 is a table listing examples of metadata that can be captured by an accessory and/or a PMD according to an embodiment of the present invention.

FIG. 3 is a table identifying some types of metadata fields that may be supported by various radio data services.

FIG. 7 illustrates a hierarchical XML dictionary file that can be used to store tags according to an embodiment of the present invention.

FIG. 14 illustrates a tag playlist according to an embodiment of the present invention.

DETAILED DESCRIPTION OF THE INVENTION

Figure 1A:
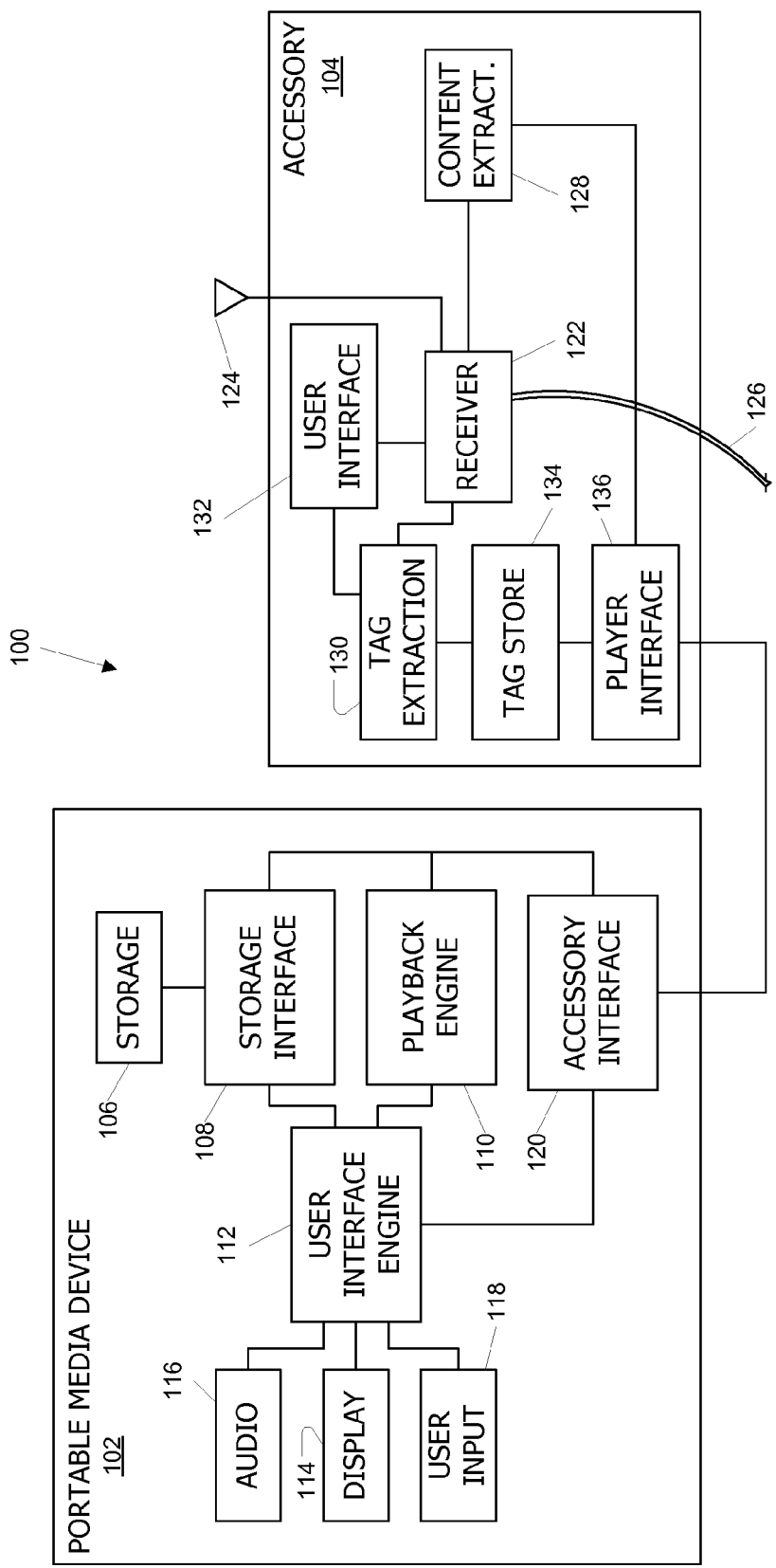
FIG. 1A illustrates a portable media device ("PMD") system for tagging broadcast content according to an embodiment of the present invention.

In accordance with some embodiments of the present invention, a portable media device and/or an accessory coupled thereto can be used to collect and store information about broadcast content received by the portable media device and/or accessory. The collected information, referred to herein as a "tag," can encompass any type of data that facilitates identification of a particular broadcast track (e.g., a song in the case of music broadcasts, a podcast, an episode of a TV program, or the like).

In some embodiments, the portable media device can be coupled to an accessory that is capable of receiving media broadcasts. The media broadcast can include broadcast content as well as metadata identifying the content (e.g., track title) and/or the broadcaster. The accessory can capture the metadata (and/or a portion of the broadcast content itself) and provide the metadata (and/or content) as a "tag" to the portable media device, either in response to a user command or automatically.

In some embodiments, the user can connect the portable media device, e.g., via a network, to a media asset delivery service, allowing stored tags to be communicated to the media asset delivery service. The user can then interact with the media asset delivery service to sample and/or acquire (e.g., download) media content corresponding to the tags.

As used herein, a "broadcast" refers generally to real-time distribution of media content (e.g., audio and/or visual data) via a wired or wireless medium to an arbitrary number of receivers that may be tuned in to receive it. Broadcast media can include, e.g., over-the-air radio or television (TV), satellite radio or TV, cable TV or music services, Internet streaming broadcasts, podcasts and so on. Broadcast data may be transmitted in analog, digital and/or hybrid forms as is known in the art. In general, a receiver does not control when a broadcast begins or ends, although some receivers (e.g., audio or video recorders) may be able to store broadcast content for later presentation to a user.

Broadcasts can be divided into "tracks," where a track is simply a subset of the broadcast content that is logically regarded as a unit. For example, each song played by a radio station can be a track. A broadcast advertisement could also be a track. An episode of a TV series can be a track, or different segments of the episode (separated, e.g., by commercial breaks) can each be a track. A program such as a talk show can be treated as a single track or divided into multiple tracks, e.g., based on the topics covered, the segmentation of the program due to advertisements, or the like. In some instances, an entire broadcast (e.g., a podcast) may be identified as a single track. In some embodiments described herein, a track can be identified based on metadata created and embedded in the broadcast, e.g., by an originator of the broadcast; when some or all of the metadata changes, a new track is indicated. A suitably configured receiver can detect and extract this metadata from the received broadcast and thereby determine when a track begins or ends.

A "portable media device" (or "PMD") as used herein refers generally to any electronic device with the capability of storing and playing media assets, including but not limited to audio assets, video assets, still images, and the like. The portable PMD can be connected to an accessory that includes a receiver, which can be any device capable of receiving a broadcast via any applicable medium (e.g., as listed above). Alternatively, a receiver can be integrated into the PMD.

In accordance with some embodiments of the present invention, the PMD can be operated to store a tag representing a broadcast track received by the receiver. As used herein, the term "tag" can encompass any type of data that facilitates identification of a particular track. Examples include: track-identifying metadata that is broadcast in association with the track; a captured portion of the broadcast content that can be analyzed and compared to known samples of tracks; and/or information identifying a source and time of the broadcast that can later be matched to a listing of the source's broadcasting activity. The tag can be provided to a media asset management and/or delivery service that sells or otherwise distributes media assets including the tagged tracks; examples of such services include the iTunes™ service provided by Apple, Inc., the Y! Music™ Unlimited service provided by Yahoo!, Inc., or the Zune™ Marketplace provided by Microsoft Corp. The media asset management and/or delivery service can use the tag to identify and provide access to the track and/or related information. For example, the user of a portable PMD that has stored tags may connect to the service and thereupon be prompted to download a tagged track, experience a preview of a tagged track, or the like.

Systems for Tagging Broadcasts

FIG. 1A illustrates PMD system 100 for tagging broadcast content according to an embodiment of the present invention. System 100 includes PMD 102 coupled to accessory 104, which is capable of receiving broadcasts. In one embodiment, PMD 102 can be, e.g., an iPod™ or iPhone™ PMD produced by Apple, Inc., and accessory 104 can be any device that is capable of receiving broadcasts and communicating with PMD 102, such as a suitably configured radio receiver (e.g., FM, AM or satellite radio in standard or hybrid digital ("HD radio" formats), a receiver for high-definition television ("HDTV") or the like.

In this embodiment, PMD 102 can include storage device 106, storage interface engine 108, playback engine 110, user interface engine 112, display 114, audio output device 116, user input control(s) 118, and accessory interface 120. In one embodiment, display 114 can include, e.g., an LCD screen, and audio output device 116 can include, e.g., a conventional headphones jack and/or one or more speakers. User input control(s) 118 can include, e.g., one or more buttons, touch pads, touch screens, scroll wheels, click wheels, or any other control(s) capable of generating electrical signals corresponding to manipulations of the control(s) by a user.

User interface engine 112 can include any combination of circuitry and/or software that enables a user to control operation of PMD 102. In one embodiment, user interface engine 112 receives user inputs from user input control(s) 118 and provides corresponding commands to storage interface 108 and/or playback engine 110. User interface engine 112 also receives data from storage interface 108 and/or playback engine 110 and provides corresponding output to a user via display 114 and/or audio output device 116. In some embodiments, user interface engine 112 also delivers media content from playback engine 108 to display 114 and/or audio output device 116. User interface engine 112 in some embodiments can also receive user input related to tagging of broadcast tracks, as described below.

Storage device 106 can be used to store information including media assets (e.g., music, video, podcasts, photos or other still images, etc.) as well as tags associated with broadcast tracks, as described below. Storage device 106 can include, e.g., magnetic or optical disk, flash memory, or any other storage medium that supports storage of data for an arbitrary period of time (e.g., until deleted by a user). Storage interface engine 108 can include any combination of circuitry and/or software that manages access to storage device 106. In one embodiment, storage interface engine 108 supports reading from and writing to storage device 106.

Playback engine 110 can include any combination of circuitry and/or software that manages playback of media assets stored in storage device 106 and, in some embodiments, playback of broadcast content received by accessory 104. In some embodiments, playback engine 110 responds to commands from user interface engine 112 and/or commands delivered from an accessory via accessory interface 120.

Accessory interface module 120 can include a connector providing mechanical and/or electrical coupling to accessory 104. In some embodiments, a "wired" coupling—e.g., a direct connection or a connection via a suitable cable—may be provided. Alternatively, accessory interface module 120 can implement a wireless connection (e.g., using Bluetooth or other wireless connection protocols). Accessory interface module 120 can also include other hardware components (e.g., logic circuits) and/or software components to interpret signals received from accessory 104 and/or to generate signals to be transmitted to accessory 104. Such signals may represent, e.g., commands and/or data being exchanged between PMD 102 and accessory 104, including commands and/or data related to tagging of broadcast tracks as described below.

Aspects of storage interface engine 108, playback engine 110, user interface engine 112, and accessory interface 120 can be implemented, e.g., using software programs running on one or more suitably configured microprocessors or microcontrollers (not explicitly shown). Other implementations are also possible; for instance, some or all of storage interface engine 108, playback engine 110, user interface engine 112, and/or accessory interface 120 might be implemented on different, interconnected processors.

Accessory 104 can be any accessory capable of receiving broadcasts. In the embodiment of FIG. 1A, accessory 104 includes receiver component 122 coupled to antenna 124 and/or cable 126, content extraction engine 128, tag extraction engine 130, user interface 132, tag store 134, and PMD interface 136.

Receiver component 122 can be used to receive broadcasts via one or more media; any broadcast medium or combination of media can be supported. In this example, receiver component 122 can connect to antenna 124, which can be capable of detecting broadcasts via a wireless medium (e.g., FM or AM radio in standard and/or HD formats, over-the-air TV, satellite TV or radio, WiFi, cellular communication network, etc.). Receiver component 122 can also connect to cable 126 and thus be capable of receiving broadcasts via a wired medium (e.g., cable TV service, wired Internet connection, or the like). Receiver component 122 may include any hardware and/or software elements usable to extract broadcast data from wired and/or wireless media as desired; the particular components will depend on the medium (or media) supported. Any combination or sub-combination of wired and/or wireless media can be supported.

Receiver component 120 can deliver signals corresponding to received broadcasts to content extraction engine 128 to deliver media content. Content extraction engine 128 can include appropriate decoding and processing components to extract audio and/or video signals from a received broadcast; these components can generate analog and/or digital signals suitable for driving video and/or audio output devices (not explicitly shown in FIG. 1A), such as display devices and/or speakers. Such output devices can be integrated into accessory 104 or supplied as external components coupled to accessory 104 via suitable connections. In addition or alternatively, content extraction engine 128 can deliver extracted content to PMD 102 via player interface 136, and PMD 102 can play the content via its own output devices. In other embodiments, an accessory 104 can be configured to selectably deliver media content to either media output devices connected to content extraction module 128 or PMD 102 or both. Thus, accessory 104 can operate while connected to PMD 102 and can also operate in a standalone mode (i.e., not connected to PMD 102).

User interface 132 of accessory 104 can provide input and/or output devices to allow a user to control the operation of receiver 122, content extraction engine 128, and/or tag extraction engine 130. For example, user interface 188 can include a button that a user can operate to instruct tag extraction engine 124 to capture or record the metadata for a currently playing track. Other buttons may allow the user to select broadcast sources and/or channels for receiver 184, adjust volume and/or picture settings, and so on.

Receiver component 122 also communicates with tag extraction engine 130. Tag extraction engine 130 captures tag information associated with broadcast content and provides the tag information to tag storage area 134. Tag storage area 134 can be used to store tags that a user of accessory 104 might opt to capture at times when accessory 104 is operating in standalone mode. Tag storage area 134 can be implemented using nonvolatile storage (e.g., magnetic or optical disk, flash memory or other storage media) and can thus store tags indefinitely, regardless of whether power is continuously supplied to accessory 104. As described below, in some embodiments, tags that a user opts to capture while accessory 104 is in standalone mode can be stored in tag storage area 134 until such time as accessory 104 is next connected to PMD 102. At that point, PMD interface 136 of accessory 104 can deliver the stored tags to PMD 102 via accessory interface 120. Accessory interface 120 can communicate with storage engine 108 to store the tags in PMD storage device 106. In other embodiments, accessory 104 might not include non-volatile tag storage and preservation of tags may be possible only when PMD 102 is connected to accessory 104.

PMD interface 136 communicates with accessory interface 120 of PMD 102. As described above, the communication may be via a wired or wireless channel. Aspects of communication between PMD 102 and accessory 104 relevant to embodiments of the present invention are described below.

Aspects of receiver 122, content extraction engine 126, tag extraction engine 130, user interface 132, and PMD interface 136 can be implemented, e.g., using software executing on one or more suitably configured microprocessors or microcontrollers (not explicitly shown). Other implementations are also possible.

System 100 can also include other components in addition to or instead of those shown here. For example, accessory 104 may include a storage device capable of storing broadcast content and may be operated as a recorder of such content. Alternatively, accessory 104 may be capable of delivering broadcast content to PMD 102 for storage in storage device 106 rather than immediate playback. In some embodiments, PMD 102 and/or accessory 104 may include fewer components than those shown herein. For example, if accessory 104 can be controlled via PMD 102, a separate user interface for accessory 104 might not be provided. As another example, in embodiments where accessory 104 is operable to tag broadcast content only when connected to PMD 102, tag storage area 134 might be omitted.

The various components of system 100 can be packaged and/or sold as one or more separate devices. For example, PMD 102 could include any or all of the components of accessory 104; thus, in one embodiment, content extraction engine 128 and/or tag extraction engine 130 could be implemented on the same microprocessor(s) as storage interface engine 108, playback engine 110 and user interface engine 112.

Where some or all components of accessory 104 are packaged and/or sold separately from PMD 102, accessory 104 can include its own user input controls and/or user output devices as noted above. A user may be able to operate PMD 104 by remote control via user interface 132 of accessory 104 and/or to use output devices of accessory 104 to play media content stored by PMD 102; similarly, the user may be able to use controls 118 of PMD 102 to operate accessory 104 and/or use display 114 and/or audio output device 116 of PMD 102 to play broadcast content received by accessory 104. For example, PMD 104 can provide a graphical radio tuner on display device 114 that can be adjusted using, e.g., user input control 118; accessory interface 120 can relay information relating to the adjustment to accessory 104, and receiver component 122 can modify its tuning accordingly.

In one embodiment, user interface 124 of accessory 104 can include a control that a user can operate to tag broadcast content. For example, user interface 124 can include a "Tag" button that the user can press at any time while listening to or watching broadcast media to indicate that a currently playing track should be tagged. Alternatively, user input devices 118 of PMD 102 can include a "Tag" button or other control that a user can operate to tag broadcast content. A "Tag" button or other control operable to tag broadcast content may also be provided on a remote control device that delivers control signals (e.g., via infrared or RF signaling) to accessory 104 and/or PMD 102.

When the "Tag" button (or other control) is operated, accessory 104 captures (or collects) a tag associated with the broadcast content. In one embodiment, the tag can include metadata that is captured from the broadcast itself and/or from other information available to accessory 104. For example, if the broadcast content is a song, identifying information transmitted in the broadcast might include, e.g., the title of the song, the name of the artist, the title of the album from which the song was extracted, a standard identification code associated with the song, or the like. If the broadcast content is a video program (e.g., an episode of a TV series), the identifying information might include, e.g., the title of the series, the title of the episode, an identification code for the series or episode, the original air date, the names of actors, directors, writers or producers involved in the episode, or the like. The metadata may also include information identifying the source of the broadcast, such as the call sign and dominant market area (DMA) of a radio or TV station, identification of a radio or TV network with which the broadcaster is affiliated, or the like.

In addition to or instead of extracting metadata from the broadcast itself, accessory 104 in some embodiments can capture a portion of the broadcast content for later use in identifying the broadcast. The captured portion can be, e.g., any portion usable as a "fingerprint" to identify the broadcast from which the portion was captured. For example, in the case of a digital broadcast, the digital sample values representing a second or two of the content might be captured. For an analog broadcast, digital sample values corresponding to the analog representation of a second or two of the broadcast content might be captured. The captured portion can be, e.g., a first portion, a last portion, or any other arbitrary portion of the broadcast content. As used herein, the term "tag" can encompass a captured portion of the broadcast content in addition to or instead of metadata that is associated with but not part of the broadcast content.

Additional metadata can be generated by accessory 104. For example, if the broadcast originates from a radio or TV station, accessory 104 can provide the frequency or channel to which it was tuned even if the transmitted metadata does not include identification of the broadcast's source. Accessory 104 might also add a timestamp indicating when the broadcast was received or tagged, or similar information.

Accessory 104 can communicate the collected tag information to PMD 102, which can store the tag in storage device 106. Communication and storing of tags is described further below.

In some embodiments, accessory 104 and/or PMD 102 can provide graphical information to the user about the broadcast content. For example, tag extraction engine 130 can supply metadata (or other information) pertaining to the currently playing track to a display device of accessory 104, or the metadata can be delivered to PMD 102 for display on PMD display device 114. Graphical information can include text (e.g., title and artist of a song or other program information), still images (e.g., album covers or advertisement), or animated images (e.g., a music video corresponding to the audio track or advertisement).

Figure 1B:
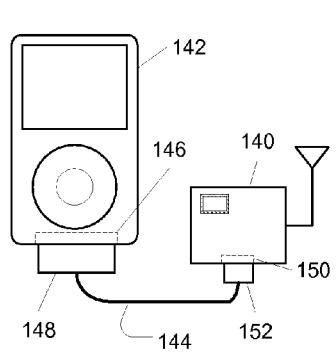
FIGS. 1B-1F illustrate a few of many possible configurations of a PMD and accessory according to various embodiments of the present invention.

PMD 102 and accessory 104 can be realized in a variety of devices having varying form factors, components, and connections. FIGS. 1B-1F illustrate a few of the many possible configurations. In FIG. 1B, portable radio adaptor 140 embodies aspects of accessory 104, and media player 142 embodies aspects of PMD 102. Portable radio adaptor 140 can connect to media player 142 via cable 144. In this embodiment, media player 142 includes connector 146 adapted to connect to one end 148 of cable 144 while portable radio adaptor 140 includes connector 150 adapted to connect to the other end 152 of cable 144. Connectors 146 and 150 might or might not have the same form factor, number of pins, etc. For example, connector 146 can be a 30-pin connector such as is used on iPod™ media players while connector 150 can be a Universal Serial Bus ("USB") or FireWire connector or other standard or custom connector. In still other embodiments, media player 142 and portable radio adaptor 140 can each include a wireless interface (e.g., Bluetooth), allowing media player 142 and portable radio adaptor 140 to communicate with each other without a physical connection.

In FIG. 1C, media player 142 again embodies aspects of PMD 102, while radio dock 160 embodies aspects of accessory 104. PMD 102 can be inserted into connector 162 of radio dock 160. In this example, radio dock 160 is connected via cable 164 to broadcast medium 166. Medium 166 could be, e.g., a cable TV network, the Internet, or any other network to which a wired connection is possible and via which a broadcast can be received. Although not expressly shown, it is to be understood that the broadcast medium can also be a wireless medium, and radio dock 160 can include an antenna or other suitable components for receiving wireless broadcasts.

Figure 1E:
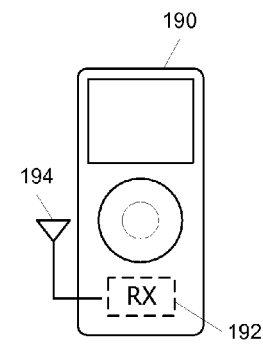
Figure 1F:
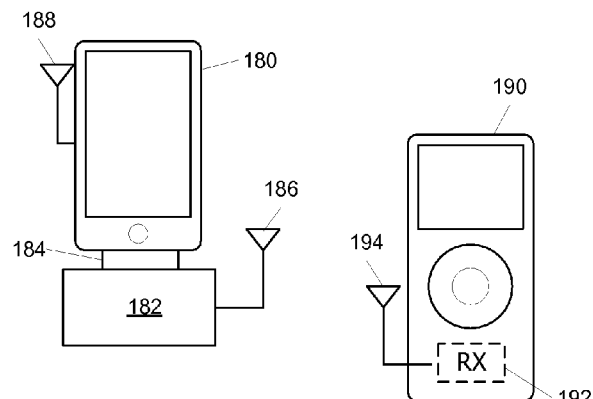
Figure 1C:
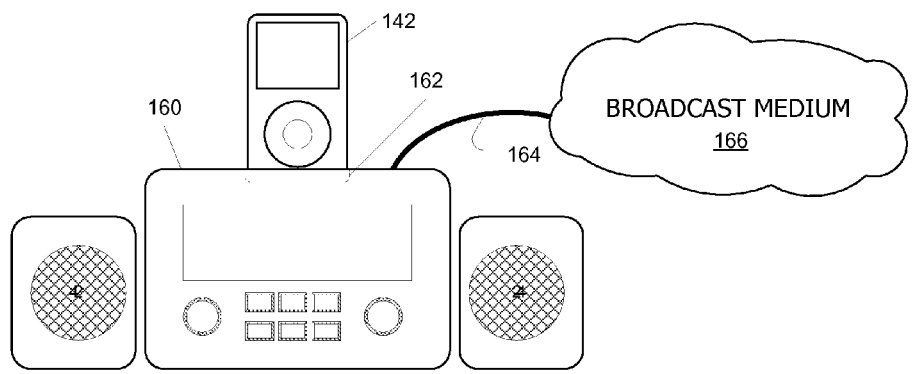
Figure 1D:
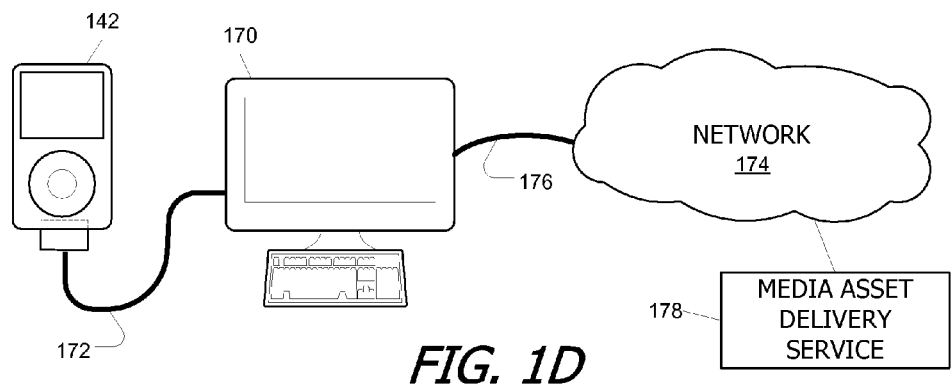

FIG. 1D shows yet another configuration, in which media player 142 can be connected to computer system 170 via cable 172. Computer system 170, which may be of generally conventional design, can be connected to network 174 (e.g., the Internet) via cable 176. (A wireless connection can be substituted for either or both of cables 172 and 176.) In this embodiment, computer system 170 may be used as a receiver for media content that is broadcast via network 174; for example, radio or TV content streamed via the Internet. In addition, computer system 170 might include a TV or radio tuner card that can be connected to an antenna or cable to provide TV or radio content to computer system 170.

Computer system 170 may also be used as a host to connect media player 142 (or other embodiments of PMD 102) to media asset delivery service 178 that sells or otherwise distributes media assets (such as songs, movies, episodes of TV or radio shows, podcasts, and the like). Examples of media asset delivery services include the iTunes™ Store service provided by Apple, Inc., the Y! Music™ Unlimited service provided by Yahoo!, Inc., or the Zune™ Marketplace service provided by Microsoft Corp.; other services might also be used. When connected to such a service, tags previously stored on media player 142 can be used to identify media assets that the user might be interested in purchasing. In one embodiment, the user of computer system 170 can view a list of previously tagged tracks and select any or all of the tracks for purchase. Some examples of specific processes for interacting with online media asset services using stored tags are described below. Other examples are described in U.S. patent application Ser. No. 11/210,172 (U.S. Patent App. Pub. No. 2006/0235864 A1).

FIG. 1E illustrates yet another configuration, in which mobile telephone and media device 180 embodies aspects of PMD 102 while radio adaptor 182 embodies aspects of accessory 104. Mobile telephone and media device 180 can be connected to radio adaptor 182 that has connector 184 adapted to mate directly to a connector port of mobile telephone and media device 180. In the embodiment as shown, radio adaptor 182 has antenna 186 adapted to receive radio broadcasts (e.g., any of the radio formats mentioned above), while mobile telephone and media device 180 has antenna 188 adapted to provide two-way communication with a data network. For instance mobile telephone and media device 180 and antenna 188 may support a WiFi protocol that enables communication between mobile telephone and media device 180 and a wireless Internet access point. Although shown as external components, antennas 186 and 188 may be integrated into the respective housings of mobile telephone and media device 180 and radio adaptor 182 or may protrude therefrom.

In FIG. 1F, portable media device 190 embodies aspects of both PMD 102 and accessory 104. PMD 190 can include an integrated radio receiver 192 and antenna 194. As in other embodiments, antenna 194 may be integrated into the housing of PMD 190 or may protrude therefrom. Radio receiver 192 can be adapted to receive various types of radio broadcasts, including any of the formats mentioned above. PMD 190 can also be adapted to connect to a data network, e.g., via a wired or wireless connection (not explicitly shown in FIG. 1F). In this embodiment, PMD 190 can receive a broadcast and interact with a user to tag a track. PMD 190 can also communicate via the data network with a media asset delivery service (e.g. media asset delivery service 178 shown in FIG. 1D) to obtained tagged content or information about tagged content, as described below.

It will be appreciated that the PMD systems described herein are illustrative and that variations and modifications are possible. A PMD may include any device capable of storing and/or playing media content for a user, and broadcast-receiving capability may be provided by a detachable receiver accessory or by receiver components built into the PMD. Further, although the embodiments of FIGS. 1B-1F may make specific reference to radio accessories, it is to be understood that an accessory can receive other types of media broadcasts in addition to or instead of radio broadcasts. PMD 102 and accessory 104 may also provide additional capabilities (e.g., recording broadcasts; making and receiving telephone calls; managing personal information such as contacts and calendar; communicating via e-mail, text messaging, instant messaging, etc.) as desired.

Although PMD 102 and accessory 104 are described herein with reference to particular blocks and modules, it is to be understood that these blocks and modules are defined for convenience of description and are not intended to imply a particular physical arrangement of component parts. Further, the blocks/modules need not correspond to physically distinct components. For instance, those skilled in the art will appreciate that different combinations of hardware and/or software components may also be used and that particular operations or features described as being implemented in software might also be implemented in hardware or vice versa.

Content of Tags

In accordance with an embodiment of the present invention, an accessory such as accessory 104 of FIG. 1A and/or a PMD such as PMD 102 of FIG. 1A can capture and store tags related to broadcast content. As noted above, the term "tag" can encompass any type of data that facilitates identification of a particular track. Examples of tags will now be described; it is to be understood that these examples are illustrative and not limiting.

In some embodiments, a tag includes metadata associated with a received broadcast. Metadata can be available, e.g., in digital audio or video broadcast streams, such as HD radio or HDTV broadcasts. In some embodiments, one or more of the following sources can be used: radio data system ("RDS") data, UPC data, international standard recording code ("ISRC") data, Global Release Identifier ("GRid") data, All Media Guide ("AMG") data, application specific data (e.g., such as that used in media management and delivery systems similar to that offered under the trademark iTunes™ by Apple Inc. of Cupertino, Calif.), or any combination thereof.

A variety of information about the track and/or the broadcaster may be included in the metadata. FIG. 2 is a table 200 listing examples of metadata that can be captured by accessory 104 and/or PMD 102 according to an embodiment of the present invention. In the table of FIG. 2, the broadcast is an audio track (e.g., a song) received from a radio station; it will be appreciated that other types of broadcast content (e.g., video broadcasts, spoken-word broadcasts, etc.) could also be tagged using similar metadata.

Metadata in one embodiment includes track-identifying information, such as track name (or title), artist name, album name, or a combination thereof. Metadata can also include a track identification code (TrackIdentifier), which can be e.g., a unique numerical value or character string identifier associated with the track. Multiple track identifiers may be supported. For example, various standard track identifiers such as an AMG identifier, an ISRC, or GRid can be used. In addition, a proprietor of a media delivery service (such as, for instance, the iTunes Store™ service of Apple Inc.) can define its own unique track identifiers and make those identifiers available to broadcast partners (selected broadcasters or all broadcasters); the broadcast partners can then embed these track identifiers as metadata in their broadcasts.

Metadata can also have temporal aspects. For example, the metadata associated with a radio talk show may change as the topics change. In this manner, the PMD can receive nontemporal metadata associated with the talk show, which is consistent for the length of the talk show, as well as temporal metadata that can be directed, e.g., to a book while the book is being discussed during the talk show or to a celebrity while the celebrity is being discussed during the talk show.

Station-identifying information can also be embedded in the broadcast data stream and extracted as metadata, e.g., by tag extraction engine 130 of accessory 104 of FIG. 1A. Station identifying information can include, for example, station frequency, station name, station genre, station call letters, station tagline, program name, disc jockey name, station message, station designated market area (DMA), station website URL, network affiliation of the station, or any combination thereof. In some embodiments, a broadcaster may register as a "broadcast partner" of a media asset delivery service (e.g., media asset delivery service 178 of FIG. 1D). The service assigns a unique affiliate identifier to each broadcast partner, and the broadcast partner can include its affiliate identifier in the metadata for each track it broadcasts. If a user tags a track, the affiliate identifier can be recorded as part of the tag, and when a recorded tag is provided to media asset delivery service 178, the service receives the affiliate identifier. In the event that the user purchases the tagged track, the service can use the affiliate identifier to award payment or other credit to the broadcast partner whose broadcast led to the purchase. (Purchasing of tagged tracks is described further below.)

In some embodiments, metadata can also include images associated with the track, e.g., album art, cover or images from a book, or the like (not listed in FIG. 2). Metadata can also include a timestamp indicating the date and time that the track was tagged. In some embodiments, a timestamp can be used in conjunction with station identifying information to identify the tagged track. For instance, when PMD 102 is connected to a data network (e.g., via host computer 170 as shown in FIG. 1D or wirelessly as shown in FIG. 1E), the stored tag information can be used to access a database in a server connected to the data network to identify the media asset that was being played at the stated time on the stated station frequency or name.

A tag can also include other information that might or might not be part of the received metadata. For example, other identification information can include in point, out point, country code, media type, program type, version information, hardware or manufacturer ID of the accessory that captured the tag, podcast feed information, or any other suitable information. If station-identifying information (e.g., frequency) is not included in the metadata, an accessory can be configured to add this information to the tag, e.g., by recording the frequency to which it was tuned when the track was tagged.

In some embodiments, a tag can be required to include a subset of the fields in FIG. 2, with other fields being optional. For instance, in some embodiments, the Name, Artist, and Album fields may be sufficient to uniquely identify most tracks, and all other fields can be made optional. In some embodiments, tag extraction engine 130 of accessory 104 (FIG. 1A) is configured to populate every field of the tag for which the broadcast source provides sufficient metadata. Further, the available fields can also include an "Unknown" field, which tag extraction engine 130 can populate with any received metadata that the accessory does not recognize. Populating the unknown field makes the unrecognized metadata available to PMD 102 and potentially to media asset delivery service 178 (or other service) with which PMD 102 communicates as described below. Media asset delivery service 178 (or other service) or PMD 102 may be able to interpret the unrecognized metadata. Thus, a tag is not limited to any particular combination of metadata fields.

In another embodiment, accessory 104 and/or PMD 102 can capture a portion of the broadcast content in a tag, in addition to or instead of metadata extracted from the broadcast stream. It is to be understood that a tag need not include all possible identifying information.

The amount and type of information available to be stored in a tag can depend on the broadcast source. In addition, different broadcast signals can include different types and/or different amounts of information. FIG. 3 is a table 300 identifying some types of data fields supported by various known radio data services, such as HD radio program service data ("PSD"), HD radio station information service ("SIS"), HD radio station information guide ("SIG"), RDS, and satellite radio program associated data ("PAD"). Table 300 also identifies data fields that might be supported in an enterprise partner feed ("EPF") used by broadcast partners of a media asset delivery service.

Alternative identification information and methods of identifying a media asset currently being broadcast that are known in the art or otherwise may also be used, including any combination of the above-described methods. Tag information can be received by an accessory or directly by a PMD in a variety of formats, and any combination of information identifying the track and/or the broadcaster (or other source) may be included in a tag.

In some embodiments, multiple networks may be used to provide the broadcast content and the tag information. For example, a PMD such as PMD 102 of FIG. 1A and/or an accessory such as accessory 104 of FIG. 1A can communicate via multiple communication networks capable of simultaneously accepting and playing a media broadcast (e.g., a radio broadcast, a television broadcast, a telephone call, etc.). The present invention can include systems and methods that use two or more of those communication networks in an integrated manner.

Figure 4A:
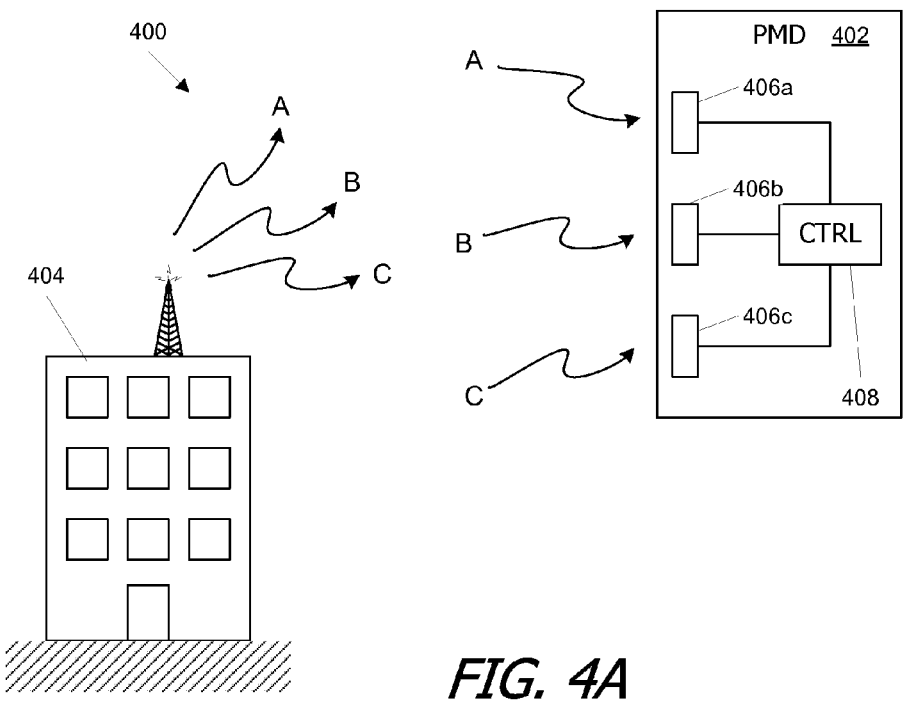
FIGS. 4A and 4B illustrate systems in which a PMD uses two or more communication networks in an integrated manner in accordance with one embodiment of the present invention.
Figure 4B:
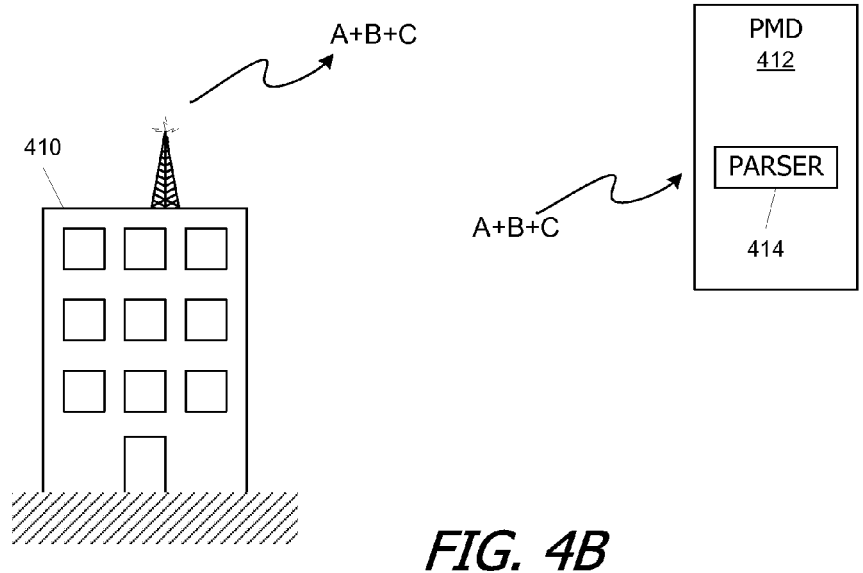

FIGS. 4A and 4B illustrate systems in which a PMD uses two or more communication networks in an integrated manner in accordance with one embodiment of the present invention. Referring first to FIG. 4A, system 400 includes PMD 402 and broadcaster 404. System 400 can manage media information transmission (e.g., media track metadata) when there are bandwidth constraints. For example, in some cases, it may be desirable to provide large amounts of metadata with a media broadcast. However, due to bandwidth limits, it may be impractical to do so. System 400 can solve this problem by using bandwidth from more than one communication network to send large amounts of information for the same media broadcast. Some embodiments of the present invention provide for transmitting and downloading information (e.g., metadata) requiring larger bandwidth and/or transmitting and downloading information more quickly by communicating different portions of the information using different communication networks.

For example, in one embodiment, broadcaster 404 can transmit a media broadcast in multiple data segments A, B, and C, each of which can be encoded in a different communication format. The multiple communication formats can be appropriate for different communication networks (e.g., cellular, internet, terrestrial radio, satellite radio, terrestrial cable, satellite cable, etc.). PMD 402 can be equipped with multiple communication receivers 406a-c configured for receiving the multiple data segments in accordance with the different communication formats. Controller 408 processes and combines the multiple data segments as appropriate to reconstruct the complete transmission.

In an alternative embodiment of the present invention, shown in FIG. 4B, media broadcaster 410 can transmit the media broadcast in a single type of communication format. PMD 412 can include parser 414, which can receive the media broadcast and parse the signal into multiple data segments A, B, and C, each of which can be encoded in a different communication format.

Figure 5:
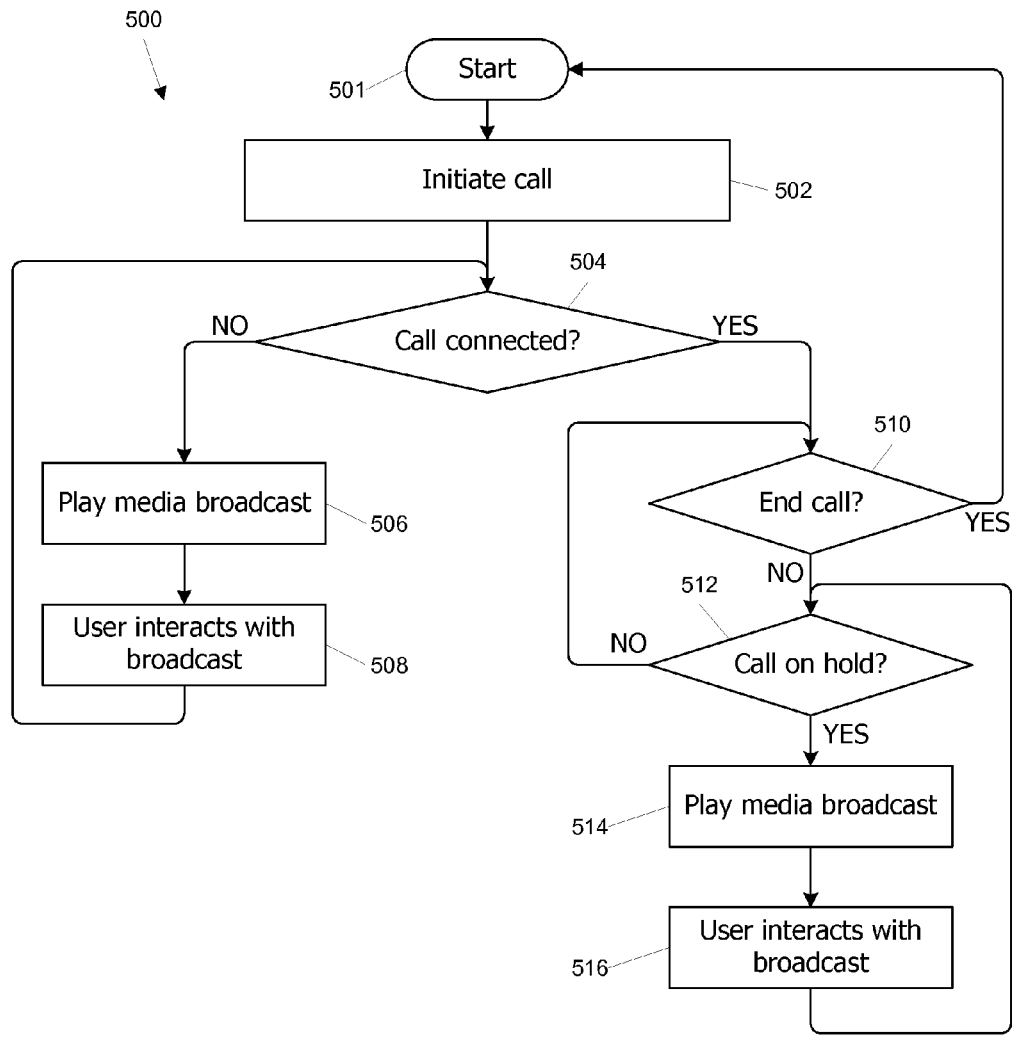
FIG. 5 is a flow diagram illustrating use of two or more communication networks in an integrated manner in accordance with an embodiment of the present invention.

FIG. 5 is a flow diagram of process 500 illustrating use of two or more communication networks in an integrated manner in accordance with an embodiment of the present invention. In this embodiment, a PMD includes telephone (e.g., cell phone or other mobile telephone capability) capability and can integrate a media transmission into otherwise dead air during a telephone call. For example, instead of dead air when a call is connecting and when the caller is put on hold, the PMD can bleed in a media transmission. During the media transmission, the user can interact with the live media broadcast, e.g., by tagging the broadcast content as described below.

The process starts (step 501) in an idle state. In step 502, a call can be initiated. In step 504, a controller in the PMD can determine whether the call has connected. If not, in step 506, the PMD can play the media broadcast, bleeding it into dead air as the call is connecting. During the period in which the media broadcast is bled into the call, the user can interact with the media broadcast (step 508), e.g., by tagging media tracks, purchasing media tracks, and/or recording the media broadcast as described below. A user may also be able to access other options while on hold or waiting for a call to connect.

If the controller determines that the call has connected, the controller then can determine whether the call has ended in step 510. If not, the controller thereafter can determine whether the call has been put on hold (step 512). If so, in step 514, the PMD can play the media broadcast, bleeding it into dead air while the call is on hold. During the period in which the media broadcast is bled into the call, the user can interact with the media broadcast (step 516), e.g., by tagging media tracks, purchasing media tracks, and/or recording the media broadcast as described below. The PMD may continue to bleed the media broadcast into the call as long as the call is on hold.

Figure 6:
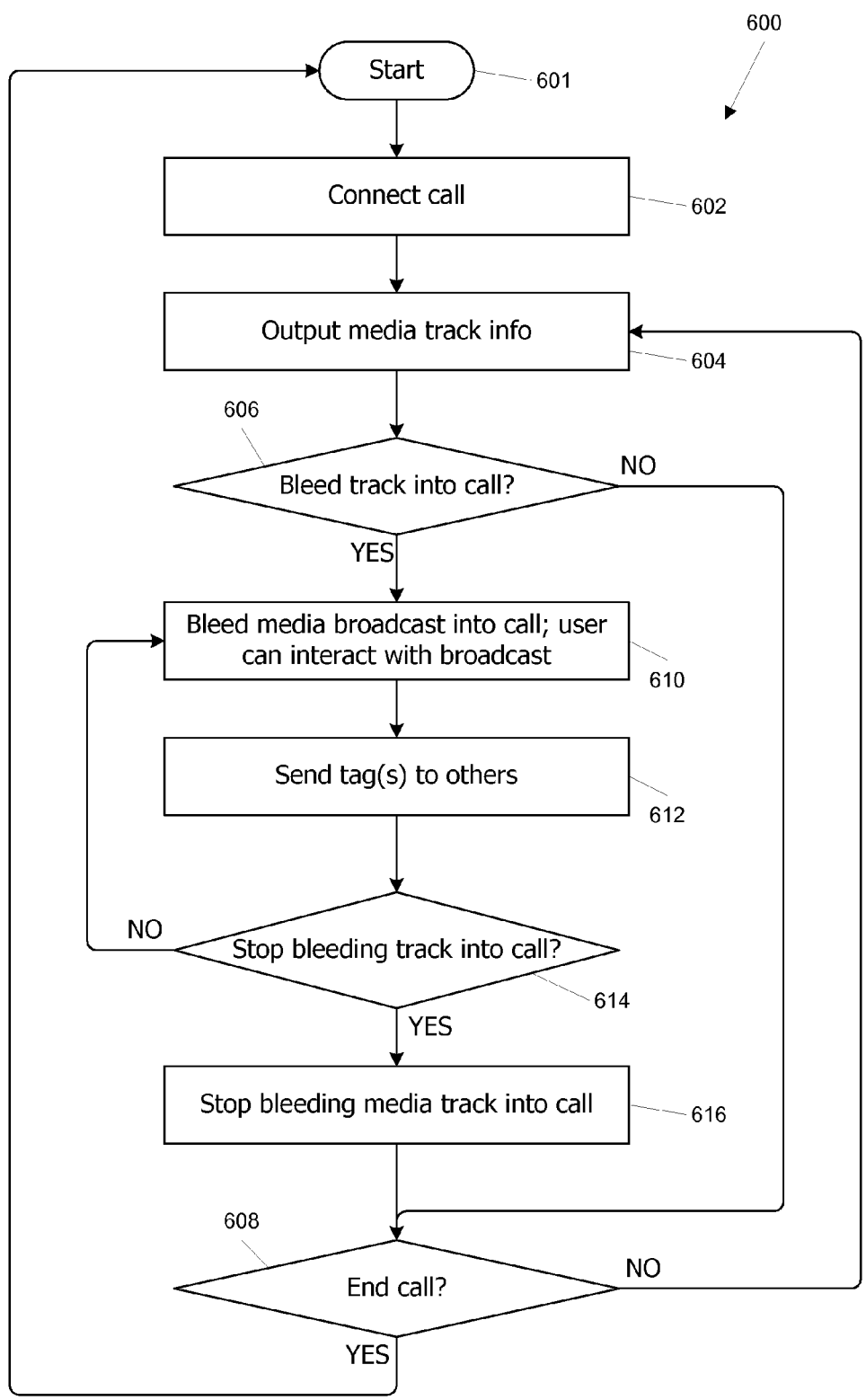
FIG. 6 is a flow diagram illustrating use of two or more communication networks in an integrated manner in accordance with another embodiment of the present invention.

FIG. 6 is a flow diagram of process 600 illustrating use of two or more communication networks in an integrated manner in accordance with another embodiment of the present invention. During a telephone call, a PMD with integrated telephone capability (e.g., cell phone or other mobile phone capability) can bleed a media broadcast into a call responsive to a user request. For example, the PMD can provide visual indication of the media being played by a radio broadcast currently being received and can selectively bleed the media stream into the telephone conversation at the user's request. The user then can tag a media file being played and share a copy of the tag with the person on the other end of the line or other people.

The process starts (step 601) in an idle state. In step 602, the PMD can connect the telephone call; for instance, the user may operate controls of the PMD to place a call or accept an incoming call. In step 604, the integrated device can output media track information or metadata being provided with the media broadcast (e.g., title and artist of a currently playing song). In one embodiment, the integrated device has a display on which the metadata can be provided to the user.

When the user is interested in the media track being played, the user can actuate a user input component of the PMD to indicate the desire to tag, purchase, or record the media track (not explicitly shown in FIG. 6). Alternatively, the user can actuate a user input component to indicate the user's desire to bleed the media broadcast into the call (step 606). If the user does not indicate a desire to bleed the media broadcast into the call, then provided that the call has not ended (step 608), the process continues to output media track info (step 604) and await further user input.

If the user indicates a desire to bleed the media broadcast into the call, then at step 610, the PMD begins bleeding the media broadcast into the call, making the broadcast audible to all parties connected to the call. The user can continue with the telephone conversation and interact with the media broadcast, e.g., by tagging media tracks, purchasing media tracks, and/or recording the media broadcast as described below. In particular, if the user or another party to the call is interested in a particular media track being played, the user or the other party can tag the media track.

In step 612, the tag of the media track can be sent to the telephone of the other party using a second type of communication network (e.g., the telephone network or an internet network). The recipient telephone does not have to support media broadcasts—that is, the recipient telephone does not need to have media receiver components or be an integrated PMD and telephone device. If the recipient telephone does support media broadcasts, the recipient device can automatically notify the recipient user when a media broadcast later plays the tagged media and provide the recipient user with an opportunity to listen to and/or purchase the media track.

At step 614, the user may indicate a desire to stop bleeding the media broadcast into the call. If the user does not indicate a desire to stop bleeding the media broadcast into the call, the process continues to bleed the track into the call (step 610), allowing the user further opportunities to interact with the broadcast. Once the user indicates a desire to stop bleeding the media broadcast into the call, the PMD stops bleeding the track into the call (step #X916). If the call has not ended (step 618), the PMD may continue outputting the media track information (step 604) and await further instructions. If the call has ended, the process returns to the idle state.

It will be appreciated that the processes described herein is illustrative and that variations and modifications are possible. Steps described as sequential may be executed in parallel, order of steps may be varied, and steps may be modified or combined. Any network or combination of networks may be used to deliver media broadcasts and/or associated information to a PMD or an accessory communicably coupled thereto.

Storing Tags in a PMD

In accordance with an embodiment of the present invention, tag information related to a broadcast can be stored in storage device 106 of PMD 102 of FIG. 1A. As described below, the tag information can be stored in a structured data file and later accessed by accessory 104 or a different accessory (e.g., computer system 170 of FIG. 1D used as a host).

In one embodiment, the structured data file can include an XML dictionary representing the metadata for each tagged track. As is generally known in the art, an XML dictionary provides a set of key-value pairs. The dictionary can be hierarchical; that is, the value associated with a particular key can be a dictionary. Various XML formats can be used; in one embodiment, the XML file is formatted as a Mac OS X Core Foundation property list.

FIG. 7 illustrates a hierarchical XML dictionary file 700 that can be used to store tags according to an embodiment of the present invention. The top-level keys in this embodiment includes:

(1) Version information. The MajorVersion and MinorVersion keys can specify the version of the XML dictionary file format. In one embodiment, files with different major versions might not be compatible with each other; files with the same major version but different minor versions are compatible with each other.

(2) Manufacturer-identifying information for the manufacturer of the accessory that collected the tags. ManufacturerID can be a unique numeric identifier of the manufacturer. In one embodiment, this identifier is assigned by a manufacturer of a line of PMDs to authorized manufacturers of accessories that interoperate with those PMDs. ManufacturerName can be the name of the manufacturer of the accessory. DeviceName can be a model name or other manufacturer-assigned name for the accessory device. iTunesAffiliateID can be used to identify the manufacturer as an affiliate of the iTunes Store™. (Other affiliations might be provided in addition to or instead of an iTunes Store™ affiliation, e.g., an affiliation with a different media asset management and/or downloading service.)

(3) A MarkedTracks key, whose associated value can be an array of one or more lower-level dictionaries. Each lower level dictionary can represent the tag information for a particular track. The tag information can include, e.g., any or all of the fields listed in FIG. 2.

As noted above, PMD 102 and accessory 104 can communicate in a variety of ways via wired (e.g., USB, FireWire, universal asynchronous receiver/transmitter ("UART")) or wireless (e.g., Bluetooth) channels. Regardless of the particular communication path, PMD 102 and accessory 104 can communicate by exchanging commands and data according to a protocol. The protocol defines a format for sending messages between PMD 102 and accessory 104. For instance, the protocol may specify that each message is sent in a packet with a header and an optional payload. The header provides basic information (e.g., a start indicator, length of the packet, and a command to be processed by the recipient), while the payload provides any data associated with the command. In some embodiments, the commands may be defined such that a particular command is valid in only one direction.

The protocol can define a number of "lingoes," where a "lingo" is a group of related commands that can be supported (or unsupported) by various classes of accessories. In one embodiment, each command is uniquely identified by a first byte identifying the lingo to which the command belongs and a second byte identifying the particular command within the lingo. Other command structures may also be used. It is not required that all accessories, or all PMDs to which an accessory can connect, support every lingo defined within the protocol.

In some embodiments, every accessory 104 and every PMD 102 that are designed to be interoperable with each other may support at least a "general" lingo that includes commands common to all such devices. The general lingo can include commands enabling the PMD and the accessory to identify and authenticate themselves to each other and to provide general information about their respective capabilities, including which (if any) other lingoes each supports. The general lingo can also include authentication commands that the PMD can use to verify the purported identity and capabilities of the accessory (or vice versa), and the accessory (or PMD) may be blocked from invoking certain commands or lingos if the authentication is unsuccessful.

In accordance with an embodiment of the present invention, a command protocol supported by PMD 102 and accessory 104 can include a "storage" lingo (or other group of commands) that can be used to communicate commands and data related to storing tags for broadcast content. In this embodiment, the commands of the storage lingo allow accessory 104 to direct PMD 102 to store tag information (or metadata) on its internal storage medium.

In one embodiment, the storage lingo includes the following commands:

(1) GetPlayerCaps. Accessory 104 can send this command to PMD 102 to request information as to the player's storage capabilities.

(2) RetPlayerCaps. PMD 102 can respond to a GetPlayerCaps command by sending back this command; the packet payload includes the requested information. In one embodiment, the capability information includes: the total size of PMD 102's internal storage medium; the largest allowed file size; the maximum amount of data that can be written to storage using a single WritePlayerFileData command (described below); and version information identifying the version of the storage lingo supported by the player. Other information might also be included in addition to or instead of the above.

(3) OpenPlayerFile. Accessory 104 can send this command to PMD 102 to instruct PMD 102 to open a file for writing tags. In one embodiment, this command is sent as a packet with a non-empty payload. The payload can contain a value (referred to herein as a "feature value") used to indicate the purpose of the file. Tag files can thus be associated with a specific feature value. The feature value allows the storage lingo to be used for other types of files; thus, the storage lingo is not limited to storing tags.

(4) RetPlayerFileHandle. PMD 102 can respond to an OpenPlayerFile command by opening a file (e.g., an XML dictionary file for tags) and using the RetPlayerFileHandle command to provide to accessory 104 a unique identifier ("handle") for the newly opened file. The handle can be similar to a Unix file descriptor. In one embodiment, the handle remains valid until either the accessory is detached or the accessory closes the file (see ClosePlayerFile command below). Use of a handle can be particularly helpful in embodiments where PMD 102 and/or accessory 104 may have multiple files open concurrently; in some embodiments, only one tag file can be open at a time, and a handle might or might not be used.

(5) WritePlayerFileData. After opening a file, accessory 104 can send this command to PMD 102 to add data (e.g., a tag for a newly tagged track) to an open file. The payload associated with this command can include the handle for the file to be written, an offset (location within the file) at which to begin writing the data, and the data to be written. Accessory 104 can limit the data size for each WritePlayerFileData command in accordance with PMD 102's limit on data per WritePlayerFileData command, e.g., as specified by PMD 102 in the RetPlayerCaps command (described above). If a tag is larger than the specified limit, accessory 104 may send multiple WritePlayerFileData commands in order to complete the writing of a tag. Accessory 104 can keep track of the offset, e.g., to avoid overwriting a previous tag with a new one. In some embodiments, the file is written sequentially; i.e., the offset begins at zero and increments in accordance with the size of each write command. In other embodiments, sequential writing is not required.

(6) PlayerAck. PMD 102 can send this command to accessory 104 to acknowledge a WritePlayerFileData command and any other storage lingo commands that do not require specific responsive information. The payload advantageously includes an identifier of the packet being acknowledged and a result status indicator, which can be a numeric value or bit pattern indicating whether the write was successful and if not, why it failed. For example, numeric values can be defined to represent specific failure conditions such as improper authentication of accessory 104, lack of resources in PMD 102, invalid file handle, excessive data size in the WritePlayerFileData packet, and so on. In some embodiments, after sending one WritePlayerFileData packet, accessory 104 waits for a PlayerAck indicating successful completion before sending another WritePlayerFileData packet or ClosePlayerFile packet (described below). Waiting for the PlayerAck can help prevent errors, e.g., if the status of the file after a failed WritePlayerFileData command is indeterminate.

(7) GetPlayerFreeSpace. Accessory 104 can send this command to PMD 102 to determine the amount of available space in PMD 102's internal storage medium.

(8) RetPlayerFreeSpace. PMD 102 can respond to a GetPlayerFreeSpace command by sending this command. The payload in one embodiment includes a value indicating the amount of free space in PMD 102's internal storage medium.

(9) ClosePlayerFile. Accessory 104 can send this command to PMD 102 to close an open file. The payload includes the handle for the file to be closed. PMD 102 can respond using the PlayerAck command (described above) to indicate whether the file was successfully closed. In some embodiments, PMD 102 can also digitally sign the file before it is closed. This signature can be used, e.g., to verify data integrity. For example conventional digital signature techniques that reveal whether a file has been modified after the signature was generated can be implemented. Once the ClosePlayerFile command succeeds, the handle is no longer valid for accessing the file that is now closed; PMD 102 can reassign the handle to another file if desired.

It will be appreciated that the command set described herein is illustrative and that variations and modifications are possible. Other commands, such as a command to PMD 102 to read from an open file and a command to accessory 104 returning the read data, can also be supported. Thus, for example, in the event of an error during write, accessory 104 can read back the data it attempted to write to determine where the error occurred; accessory 104 can then issue a corrective WritePlayerFileData command or close the file and open a new one as needed.

It should also be noted that in some embodiments, accessory 104 can open multiple files at once, as long as the handle assigned to each file is unique.

Processes for Capturing Tags

In some embodiments of the present invention, PMD 102 and accessory 104 communicate to capture and record tags in a storage medium of PMD 102.

Figure 8:
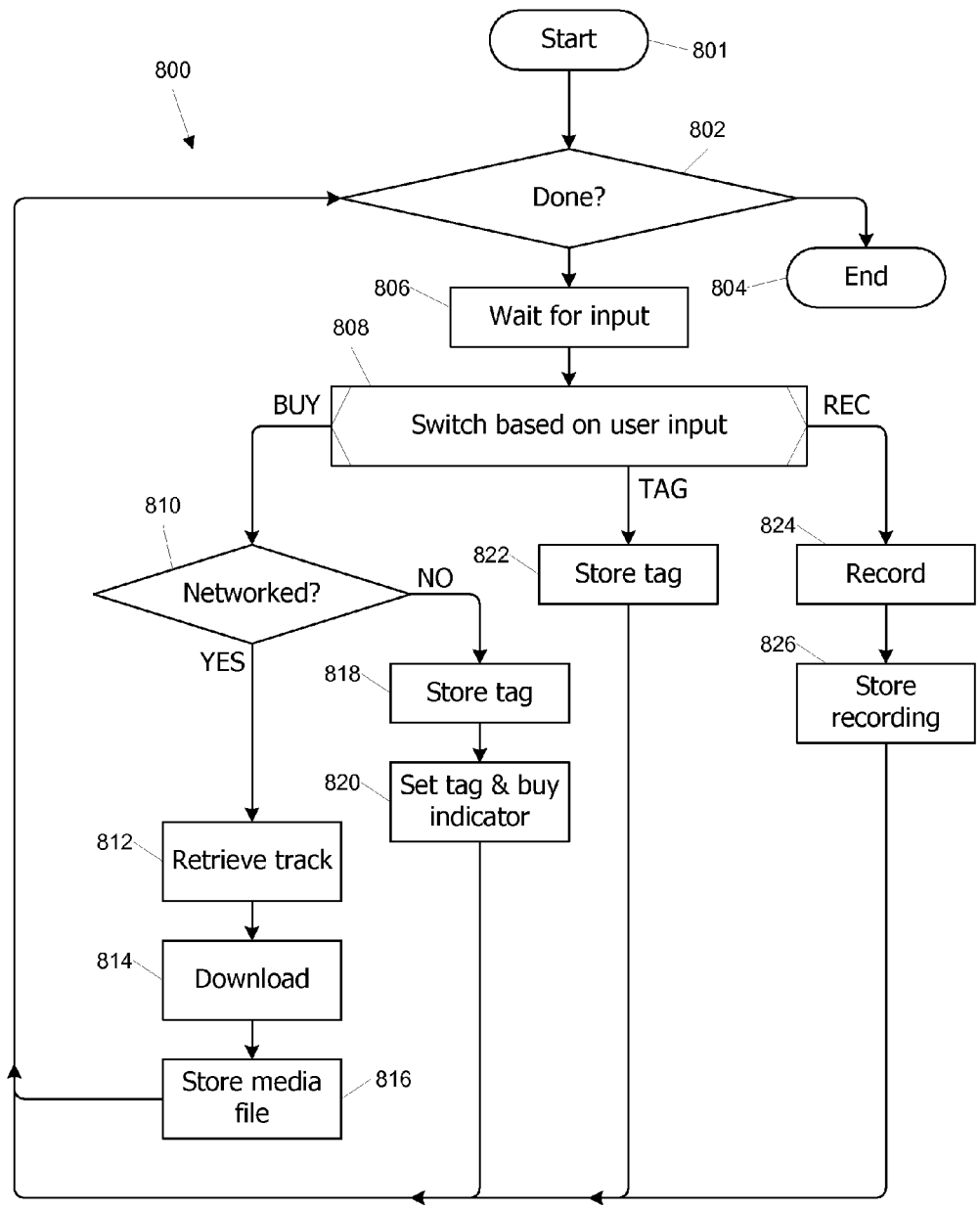
FIG. 8 is a flow diagram illustrating user interactions with media broadcasts in accordance with one embodiment of the present invention.

FIG. 8 is a flow diagram of process 800 illustrating user interactions with media broadcasts in accordance with one embodiment of the present invention. Any one or more of the steps of process 800 can be initiated and performed by a controller (e.g., microcontroller or microprocessor executing suitable program code) of PMD 102 or accessory 104 of FIG. 1A.

The process begins at step 801, at which the controller can initiate a user interaction program. At step 802, the controller can check to see whether any additional interactions with media broadcasts are likely. For example, the controller can check whether there is an error in the system (e.g., receiver 122 is not receiving a signal) or whether the user has indicated an intention to stop interacting with live media broadcasts (e.g., by turning off PMD 102 or accessory 104). If no additional interactions are likely, the controller can exit the process (step 804).

If additional interactions are likely, in step 806, the controller can wait for the user to actuate a user input, e.g., user input component 118 of PMD 102 or user interface component 132 of accessory 104, or the like. While waiting, the PMD or accessory can indicate to the user that the content that is currently playing is "taggable." The PMD can also indicate the quality of the tag (using a display device, audio emitting device, etc.). Some broadcasts can have a less taggable information than others, which can have a very rich, complete tag available. Whatever information is available can be displayed by some embodiments of the PMD or accessory.

When the user actuates one of these user inputs, the controller can determine which function the user wants to initiate (step 808). In one embodiment, the user can select among multiple functions including buying the current track ("BUY" function), tagging the current track for possible later purchase ("TAG" function), or recording the current track ("REC" function). The user's selection can be determined based on, e.g., the user input actuated when multiple user inputs are provided, the number of times or length of time the user engages the user input when the user input is multi-functional, etc.

If the BUY function is selected, the controller initiates a purchase of the currently playing track. In step 810, the controller can determine whether PMD 102 or accessory 104 is currently connected to a data network via which a media asset delivery service is accessible. For example, referring to FIG. 1D, computer system 170 is an accessory that can be connected to media asset delivery service 178 via network 174 while also receiving a media broadcast via network 174. As another example, referring to FIG. 1E, PMD 180 can be connected wirelessly to a network and through the network to a media asset delivery service while accessory 104 receives a media broadcast. If the PMD or accessory is connected to a data network, in step 812, the controller can retrieve the currently playing track (or further descriptive information pertaining thereto) from the media asset delivery service.

In one embodiment of the present invention, the controller can tag the song or other audio track currently being played, even when the PMD or accessory is networked. In this case, the tag may be stored with an indicator that designates the associated media track as being one that has already been purchased.

At step 814 the controller can download a media asset corresponding to the currently playing track from the media asset delivery service. At step 816, the controller can store the downloaded media asset, e.g., in storage device 106 of PMD 102 or in a storage device of accessory 104. The media asset can be stored as a single file or as multiple files (e.g., as a media content file and an associated file with corresponding identification information). If the media asset is stored in accessory 104, the user can download the file into PMD 102 at a later time. Similarly, if the media asset is stored in PMD 102 or accessory 104, the user can download or transfer the file(s) from one device to the other at a later time. The controller also can add the downloaded audio track to a predetermined or user-specified playlist stored on, e.g., PMD 102. In some embodiments, a computer system (e.g., computer system 170 of FIG. 1D) acts as a host system for PMD 102, with the user managing assets stored on PMD 102 via suitable software executing on computer system 170 (e.g., the iTunes™ media asset management software provided by Apple Inc.). In this instance, the media asset may first be downloaded to the host system, then transferred (e.g., copied or moved) to PMD 102.

Returning to step 810, if PMD 102 and accessory 104 are currently unable to communicate with the media asset delivery service (e.g., neither device is connected to a suitable network), then in step 818, the controller can store a tag for the track currently being played and include a "buy indicator" with the tag (step 820). The buy indicator indicates that the user has already decided to acquire the track, and when PMD 102 or accessory 104 is next able to communicate with the media asset delivery service, the track can be downloaded without further user interaction.

When the controller tags the audio track, the controller can provide visual and/or audio feedback, e.g., to acknowledge the tag. As used herein, when the controller tags a media track during a live broadcast, the controller extracts information from the live broadcast that can be used to identify the audio track being played and stores the extracted identification information for later use. The tags can be stored in any of the above-mentioned storage media, including media located on PMD 102 and/or accessory 104. Storing of tags and communicating tags between accessory 104 and PMD 102 is described further below.

Referring again to step 808, if the user actuates the user input to indicate the TAG function, the controller can tag the track currently being played in the media broadcast in step 822. As described below, when a user indicates the TAG function, the user can be given an opportunity to review information about the tagged track at a later time before deciding whether to purchase the track.

Referring again to step 808, if the user actuates the user input to indicate the REC function, at step 824, the controller can initiate one of multiple recording operations—manual recording, scheduled recording, and pause recording. In manual recording, the controller can record a segment of the broadcast that currently is being received. The recording begins when the user input indicating manual recording is received and ends when a further user input indicating end of recording is received.

In scheduled recording, the controller can permit the user to instruct the controller to record a segment of a future broadcast. The controller can present the user with schedule information using, e.g., EPG (electronic program guide) data, which can be encoded within a broadcast or provided separately (e.g., via a second network as shown in FIGS. 4A and 4B), and the user can select one or more broadcast segments to be recorded based on the EPG data. A tag can be stored to correspond to each scheduled recording.

In pause recording, the controller can "pause" the live broadcast, e.g., in a manner similar to that employed by the media system offered by TiVo of Alviso, Calif. For example, the controller can continuously buffer a predetermined amount of the received transmission. When the user "unpauses" the transmission, the controller can iteratively output the buffered transmission and continue to buffer the live broadcast. During playback of a buffered transmission, the controller can permit the user to buy or tag audio tracks currently being played or manually record the broadcast, as described above. As used herein, playback of buffered radio transmission when using the pause function is considered a live media broadcast.

In step 826, the controller can store the recorded media broadcast in one of the above-mentioned storage mediums.

PMD 102 and accessory 104 can interact in a variety of ways to collect and store tag data. Examples will now be described. In one embodiment, accessory 104 uses the storage lingo described above to write an XML file in the format of FIG. 7 to a storage medium of PMD 102. The XML file can contain all of the tags collected during a period when accessory 104 is connected to PMD 102. In alternative embodiments, each tag can be written to a separate tag file. In still other embodiments, accessory 104 can collect tag information in its own internal storage medium, then transfer the collected information to PMD 102 when PMD 102 next connects to accessory 104.

Figure 9:
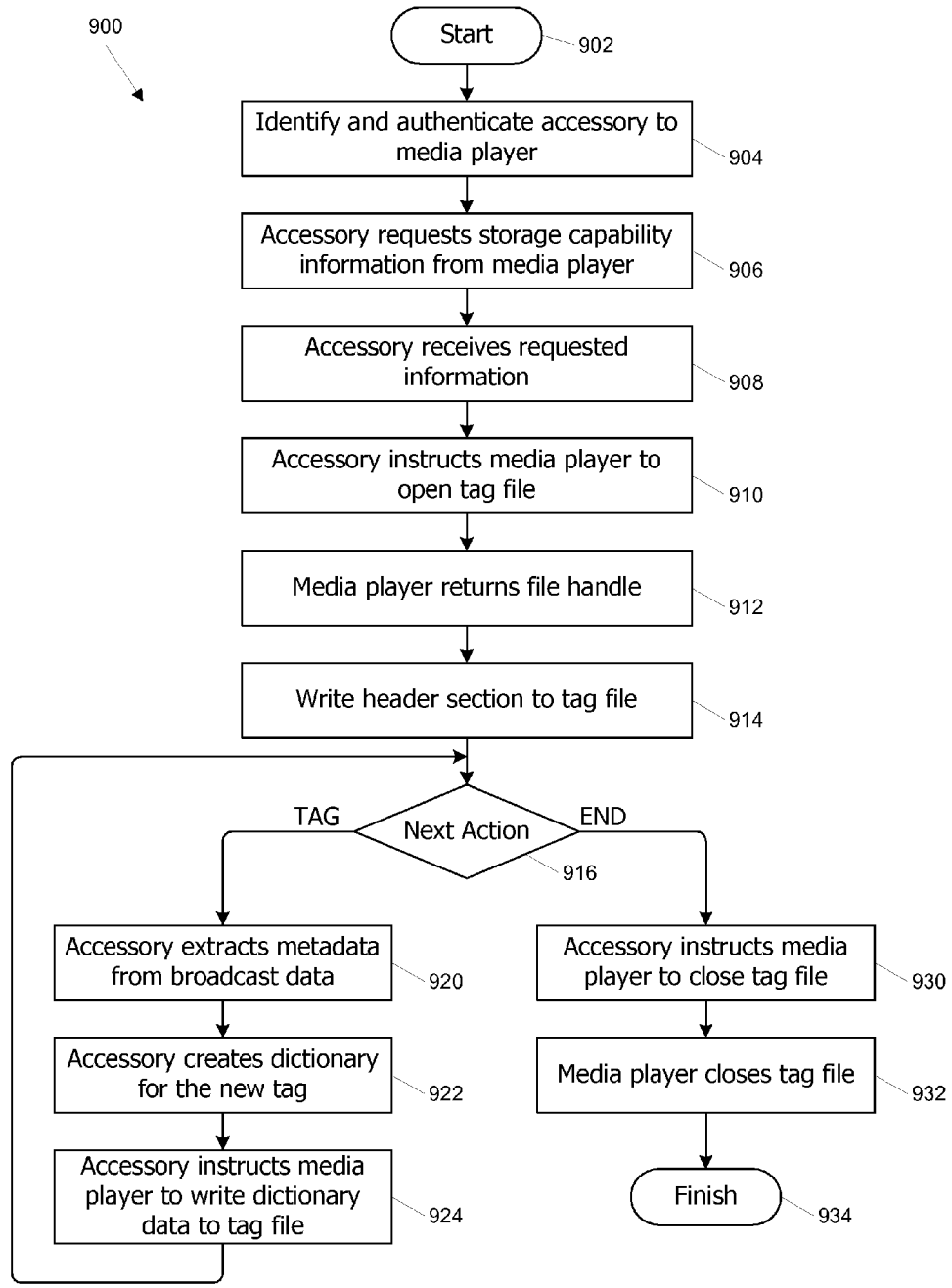
FIG. 9 is a flow diagram of a process for capturing and recording tags according to an embodiment of the present invention.

FIG. 9 is a flow diagram of a process 900 for capturing and recording tags according to an embodiment of the present invention, illustrating use of the storage lingo commands described above and the XML file of FIG. 7. Process 900 begins (step 902) when accessory 104 is connected to PMD 102. At step 904, accessory 104 identifies itself to PMD 102 and can perform an authentication procedure. Step 904 may include determining whether accessory 104 and PMD 102 are compatible with respect to the storage lingo; if they are not, then process 900 might not be used.

Assuming PMD 102 and accessory 104 are compatible with respect to the storage lingo, accessory 104 proceeds to open a file for writing tags. For example, at step 906, accessory 104 can send a GetPlayerCaps command to determine the storage capabilities of PMD 102. PMD 102 can return the information using a RetPlayerCaps command (step 908). Accessory 104 may also request additional information before proceeding. For instance, accessory 104 might use a GetPlayerFreeSpace command to ascertain the amount of space available for writing tags in PMD 102's internal storage medium.

Once the capabilities of PMD 102 have been ascertained, accessory 104 can send an OpenPlayerFile command, identifying the file to be opened as a tag file, at step 910. In response, PMD 102 opens a file. In one embodiment, PMD 102 can maintain a folder (or directory) tree for storing its files, and tag files can be always opened in the same folder within this tree, making them easy to locate later. At step 912, PMD 102 returns a RetPlayerFileHandle command with the handle for the newly opened file.

At step 914, the initial information (e.g., top-level dictionary block 710 of FIG. 7) is written to the file. In embodiments where the file is identified as being for tags (e.g., using the feature value as described above), the initial information may be automatically written by PMD 102 upon opening the file. In other embodiments, accessory 104 may write the initial information using one or more WritePlayerFileData commands.

Once the file is opened, process 900 waits for a next action (step 916). In this embodiment, the relevant next actions are tagging a track and exiting the tagging session.

Tagging a track can occur, e.g., in response to a request from the user. For instance, while a track is playing, the user may operate a user interface control of accessory 104 to indicate that the track should be tagged. As noted above, PMD 102 or accessory 104 can indicate to a user when a playing track is taggable and may provide information as to the amount of metadata available (e.g., by displaying available metadata).

At step 920, accessory 104 can extract the metadata or other data to be used as a tag from the broadcast data stream. For example, accessory 104 can extract metadata from the broadcast data stream, add additional information (e.g., station or channel to which accessory 104 is tuned, URL from which accessory 104 is receiving data, timestamp, identifying information for the accessory), and/or capture a representation of a subset of the broadcast content. In an alternative embodiment, accessory 104 might extract and buffer the tag information as each track is received, with the tag information being written to the tag file only if the user elects to tag that track.

At step 922, when the user has requested a tag for the track, accessory 104 creates an XML dictionary (e.g., a low-level dictionary block such as block 720 in FIG. 7) for the new tag. At step 924, accessory 104 can send one or more WritePlayerFileData commands to PMD 102 to write the XML dictionary to the already-opened file. In one embodiment, after creating the XML dictionary, accessory 104 determines the size of the dictionary and compares that size to the maximum write size (obtained from the player at step 908). Based on this comparison, accessory 104 can determine how many WritePlayerFileData commands are needed and can issue them sequentially to PMD 102. For each WritePlayerFileData command sent, accessory 104 can receive a PlayerAck command and can use the payloads of these commands to determine whether any errors occurred so that appropriate corrective action can be taken. For example, if an error occurred, accessory 104 can close the file, open a new file and attempt to write the tag again. As another example, if a write fails due to lack of space in storage device 106 of PMD 102, accessory 104 can alert the user that the tags cannot be transferred until space is freed on PMD 102.

After writing the XML dictionary for the new tag, process 900 returns to step 916 to await the next user action. The XML file can be held open during this time; thus, any number of tags can be written to the same XML file. In other embodiments, file formats other than XML or XML dictionaries may be used, and process 900 can be modified to write tag data using any desired format.

Eventually, accessory 104 detects that the current tagging session should end. For example, the maximum file size might be reached, the user may initiate a detach or power-down process that decouples accessory 104 from PMD 102, or the user might set accessory 104 and/or PMD 102 into a state in which tags are not recorded. In response, at step 930, accessory 104 can send a ClosePlayerFile command to close the XML dictionary file. In some embodiments, before sending the ClosePlayerFile command, accessory 104 may first write the final closing tags to the XML file (e.g., closing tags 730 in FIG. 7). In other embodiments, PMD 102 may respond to the ClosePlayerFile command for a tag file by writing the final closing tags and then closing the file. In either case, at step 932, once the file is closed, PMD 102 can send a PlayerAck command to accessory 104 to confirm that the file was properly closed. Thereafter, process 900 ends (step 934).

Figure 10:
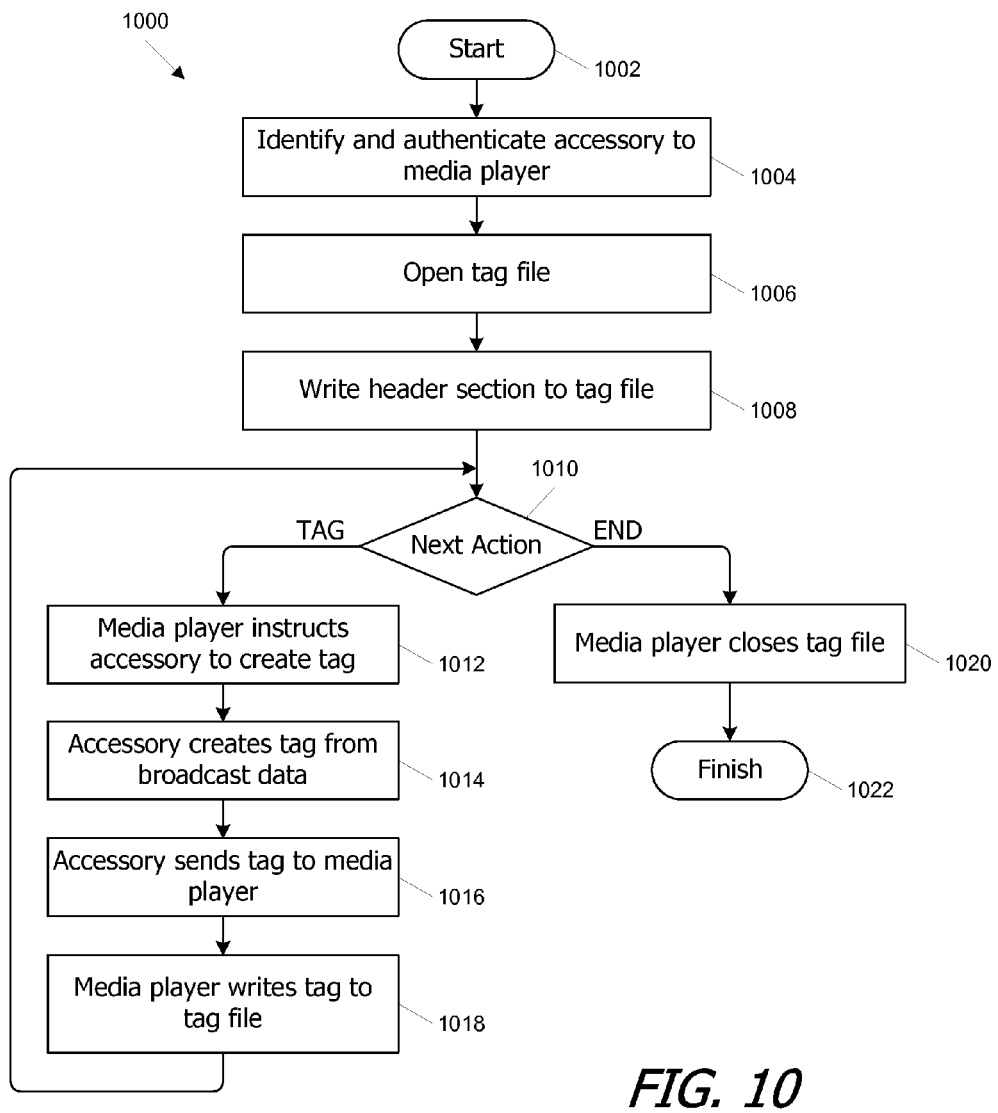
FIG. 10 is a flow diagram of a process for capturing and recording tags according to another embodiment of the invention.

Other tagging processes can also be used. For example, FIG. 10 is a flow diagram of a process 1000 for capturing and recording tags according to another embodiment of the invention. In process 1000, PMD 102 can determine whether a track should be tagged and instruct accessory 104 to create the tag.

Process 1000 starts (step 1002) when accessory 104 is connected to PMD 102. At step 1004, accessory 104 identifies itself to PMD 102 and can perform an authentication procedure; this step may be similar to step 904 of process 900 described above. At step 1006, a tag file is opened. The tag file in this embodiment resides in a storage medium of PMD 102, and procedures similar to steps 906-912 of process 900 may be used to open the tag file. If accessory 104 does not control writing of tags to the tag file in this embodiment, a file handle might not be returned to accessory 104 when the tag file is opened. At step 1008, the header section is written to the tag file, e.g., by PMD 102.

Once the tag file is opened, process 1000 waits for a next action (step 1010). The next action may indicate that the track should be tagged; for instance, the user might operate a user interface control on accessory 104 or PMD 102 to indicate that the track should be tagged. If the track should be tagged, then at step 1012 PMD 102 can instruct accessory 104 to create the tag. At step 1014, accessory 104 creates the tag from the broadcast data. For example, as described above, accessory 104 can extract metadata from the broadcast data stream, add additional information, and/or capture a representation of a subset of the content. In one embodiment, accessory 104 may format the tag as an XML dictionary or other format suitable for writing to a tag file. At step 1016, accessory 104 can send the tag to PMD 102 (e.g., using one or more WritePlayerFileData commands as described above). At step 1018, PMD 102 writes the tag to the tag file. Process 1000 can then return to step 1010 to wait for the next action.

If the next action indicates an end to the current tagging session, PMD 102 closes the tag file at step 1020, and process 1000 ends (step 1022). (As described above, accessory 104 may also detect the end of a tagging session and instruct PMD 102 to close the tag file.) As in process 900 described above, ending the tagging session may occur under various conditions, such as when the maximum tag file size is reached, when the user initiates a detach process or otherwise changes the state of accessory 104 such that tags will no longer be received or recorded.

Figure 11:
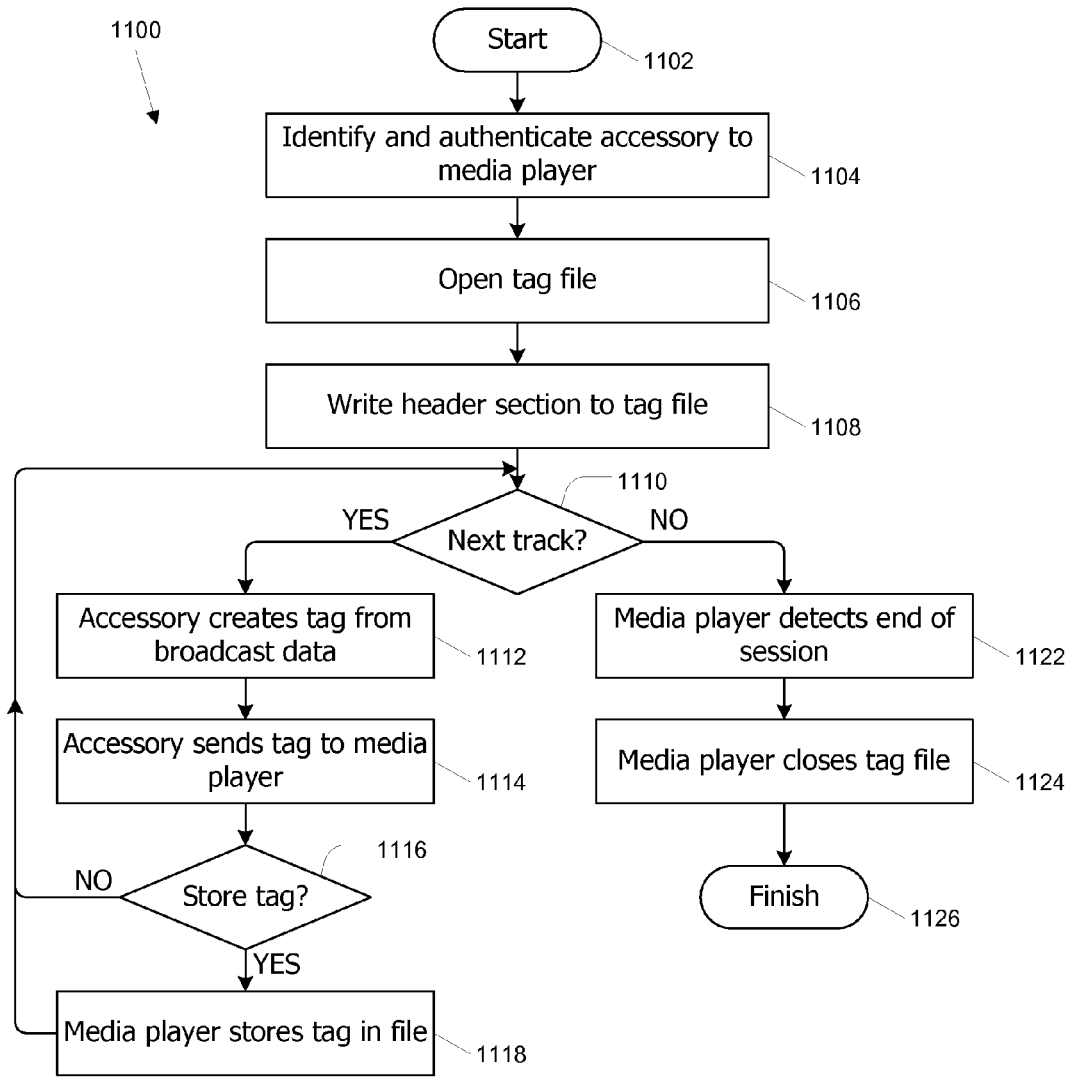
FIG. 11 is a flow diagram showing a tagging process according to yet another embodiment of the present invention.

FIG. 11 is a flow diagram showing a tagging process according to yet another embodiment of the present invention. In this embodiment, accessory 104 can create a tag for every track received during a tagging session, while PMD 102 selects which tags will be stored. Process 1100 starts (step 1102) when accessory 104 is connected to PMD 102. At step 1104, accessory 104 identifies itself to PMD 102 and can perform an authentication procedure; this step may be similar to step 904 of process 900 described above. At step 1106, a tag file is opened. The tag file in this embodiment resides in a storage medium of PMD 102, and procedures similar to steps 906-912 of process 900 may be used to open the tag file. Since accessory 104 does not control writing of tags to the tag file in this embodiment, a file handle might not be returned to accessory 104 when the file is opened. At step 1108, the header section is written to the tag file, e.g., by PMD 102.

At step 1110, accessory 104 (or PMD 102) detects a next track in the broadcast, e.g., by detecting a change in the broadcast metadata. If there is no next track (e.g., the broadcast ends or accessory 104 stops receiving broadcast data), process 1100 ends as described below.

When a next track is detected, at step 1112, accessory 104 creates a tag from the broadcast data. For example, as described above, accessory 104 can extract metadata from the broadcast data stream, add additional information, and/or capture a representation of a subset of the content. At step 1114, accessory 104 can send the tag to PMD 102 (e.g., using one or more WritePlayerFileData commands as described above).

At step 1116, PMD 102 determines whether to store the tag; if the tag is to be stored, PMD 102 writes the tag to the tag file at step 1118. Process 1100 can then return to step 1110 to await the next track. Process 1100 continues until the tagging session ends, at which point there is not a next track. In one embodiment, PMD 102 can detect the end of the session (step 1122) and close the tag file (step 1124) before process 1100 ends (step 1126). Alternatively, as described above, accessory 104 may also detect the end of a tagging session and instruct PMD 102 to close the tag file.

The determination whether to store a tag (step 1116) can be made in various ways. In one embodiment, PMD 102 might receive a user input indicating that a currently playing track should be tagged, and the decision whether to store the tag for a currently-playing track can be based on whether that user input is received while the track is playing.

In another embodiment, PMD 102 can support a real-time logging mode, in which a tag corresponding to every track received during a session of playing broadcast content is stored. This can be convenient, e.g., in cases where the user is unable to (or simply forgets to) operate a control to indicate which tracks should be tagged while playing the broadcast. The user can later review a log of tracks that were played and select those that are of interest. In some embodiments, the real-time logging mode can be enabled or disabled by a user, or logging can be a fully automatic behavior, with PMD 102 automatically storing the tags for each broadcast session as a log file (which can be similar to a tag file). Log files can be stored indefinitely (e.g., until the user deletes them or as space permits) or for some predetermined time period, or some number of most-recent log files can be stored. Other techniques for determining which tags to store may also be used.

In still another embodiment, accessory 104 can collect tags for later forwarding to PMD 102. For example, as shown in FIG. 1A, accessory 104 can include its own tag storage area 134. When operating in standalone mode (i.e., with PMD 102 not connected), accessory 104 can store tags in tag storage area 134. Tags can be stored indefinitely, e.g., until they are transferred to PMD 102.

Figure 12:
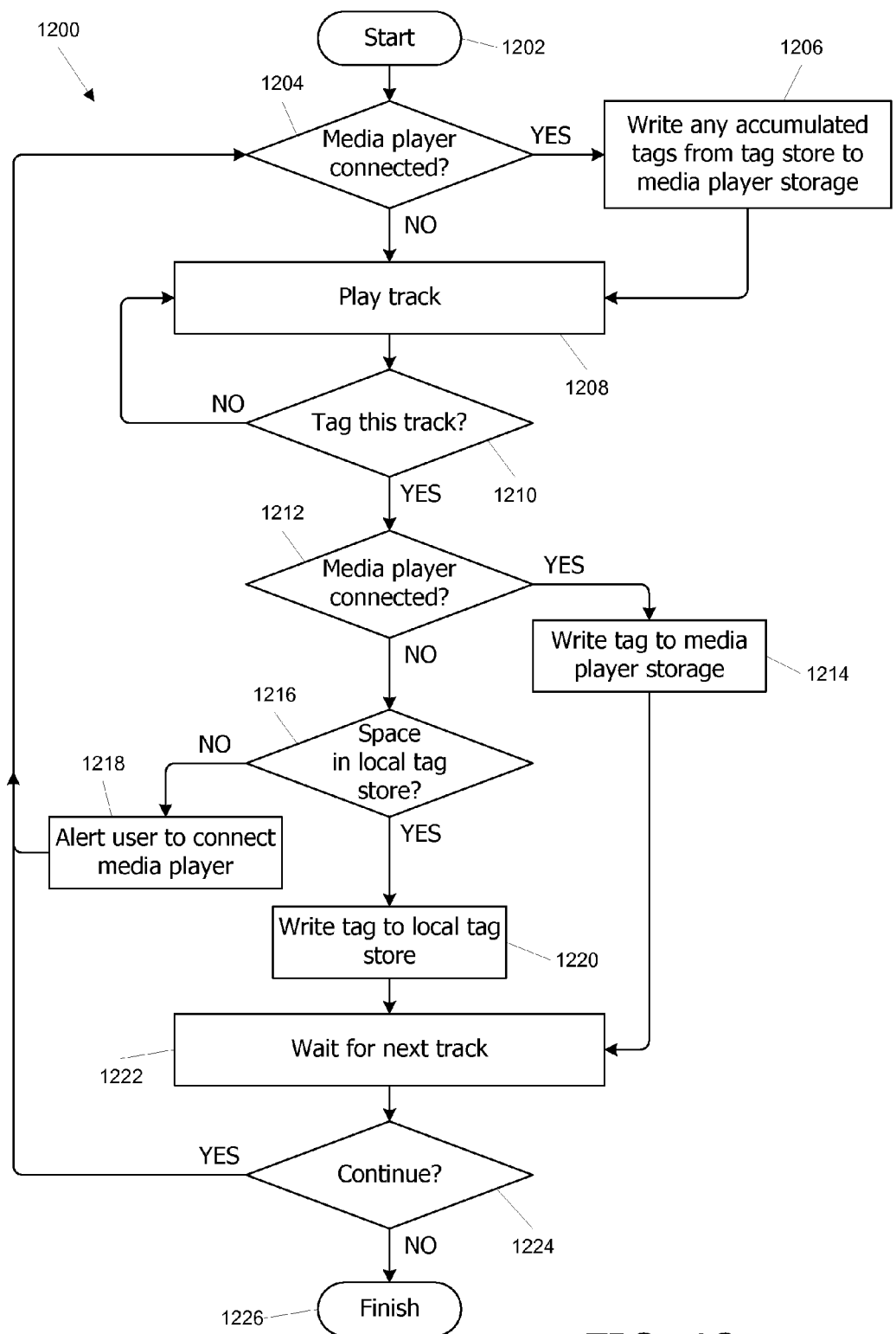
FIG. 12 is a flow diagram of a tag capture and recording process that can be used by an accessory that has local tag storage according to an embodiment of the present invention.

FIG. 12 is a flow diagram of a tag capture and recording process 1200 that can be used by an accessory that has local tag storage according to an embodiment of the present invention. In this embodiment, tracks can be tagged by the accessory (e.g., accessory 104 of FIG. 1A) regardless of whether the accessory is connected to a PMD (e.g., PMD 102).

When process 1200 begins (step 1202), accessory 104 determines whether PMD 102 is connected (step 1204). If so, then at step 1206, accessory 104 can write any accumulated tags from tag storage area 134 to PMD 102. For example, accessory 104 can open a tag file using the OpenPlayerFile command, write each accumulated tag to that file using one or more WritePlayerFileData commands, then close the file using the ClosePlayerFile command. Once the accumulated tags have been successfully written to PMD 102, accessory 104 can remove the tags, freeing up space in tag storage area 134 to store new tags.

If, at step 1204, PMD 102 is not connected or after all tags have been written to PMD 102 at step 1206, process 1200 proceeds to step 1208, where a broadcast track is played. For example, the user may tune receiver 122 to a particular station. Step 1208 may also include detecting metadata associated with the current track and holding such metadata in a buffer until accessory 104 determines whether the metadata should be saved.

At step 1210, it is determined whether the current track should be tagged. For example, the user may press a button or operate some other control of user interface 132 (or user input 118 of PMD 102) to indicate a desire to tag a track. As described above, other criteria may also be used in this determination (e.g., whether automatic logging of all tracks is enabled). If the current track is not to be tagged, process 1200 can return to step 1208 to continue playing the track, eventually advancing to the next track and so on.

If step 1210 results in a determination that the track should be tagged, process 1200 determines whether PMD 102 is connected (step 1212). If so, then at step 1214, the tag is delivered to PMD 102, which can write the tag to a tag file storage device 106 as described above. Any of the techniques described above can be employed to write the tag. In some embodiments, PMD 102 can generate a digital signature for the tag before writing the tag, and the digital signature can be used later to verify that tag data provided by accessory 104 has not been modified. In some embodiments, PMD 102 can also include its own identifier (e.g., a serial number of PMD 102) in the digital signature, and this identifier can be used by a later recipient of the tag to verify that the PMD supplying the tag is the same one that initially stored it. In another embodiment, accessory 104 can open a file, write the tag and close the file once a successful write has been confirmed, creating a separate file for each tag written while PMD 102 is connected.

If PMD is not connected at step 1212, then the tag should be written to tag storage area 134 of accessory 104. In some embodiments, a tag can also be written to tag storage area 134 if a write to PMD 102 is attempted and fails. To write to tag storage area 134, accessory 104 can first determine (step 1216) whether sufficient storage space for storing the tag is available in tag storage area 134. If not, then at step 1218, accessory 104 can alert the user to connect PMD 102 to accessory 104, and process 1200 returns to step 1202. If the user connects PMD 102, accessory 104 can transfer the accumulated tags to PMD 102, freeing up its local storage to support storing of additional tags.

Referring again to step 1216, if space is available in tag storage area 134, accessory 104 proceeds to store the tag in tag storage area 134 (step 1220).

At step 1222, after a tag has been written, accessory 104 can wait for the next track to begin before accepting further requests for tags. Thus, even if the user operates a control to request a tag multiple times during a single track, accessory 104 in this embodiment would write the tag just once and avoid filling up storage space (either its own tag storage area 134 or storage device 106 of PMD 102) with redundant tags.

Step 1224 provides an option to exit process 1200, e.g., if accessory 104 is being powered down or switched to another operating mode in which tagging would not be used. If process 1200 does not exit (step 1226), the process can continue in a loop, checking periodically to see if PMD 102 has been connected so that any accumulated tags can be transferred thereto.

It will be appreciated that the various embodiments of tagging processes described herein are illustrative and that variations and modifications are possible. Steps described as sequential may be executed in parallel, order of steps may be varied, and steps may be modified or combined. Commands and command sequences described herein may be modified. For example, in some embodiments, accessory 104 might not instruct PMD 102 to open a tag file during a session until the first time the user initiates a tagging operation during that session. In other embodiments, accessory 104 might open a file, write a tag, and promptly close the file to protect against data loss that may result if an error occurs while the file is held open. Thus, accessory 104 could create any number of tagging files in a single session, and each file might hold only one tag. In another alternative embodiment, accessory 104 might reopen a previous tag file (assuming the maximum file size has not been reached) rather than creating a new tag file for each session. Decisions whether to tag a track can be made by either the PMD or the accessory on a track-by-track or session-by-session basis.

Ambiguous Tags

Some embodiments also provide detection and handling of "ambiguous" tags. For instance, depending on how metadata is transmitted, it is possible that the metadata stream might not begin delivering metadata for a given track exactly in synchrony with the start of the content for the track. By way of illustration, current HD radio standards allow up to a five-second offset in either direction, so that metadata for a new track might arrive as early as five seconds before the previous track ends or as late as five seconds after the new track begins. If the user requests a tag during this ten-second transitional window, it is possible that the current metadata might not correspond to the track the user actually wanted; such requests are examples of ambiguous requests.

Figure 13A:
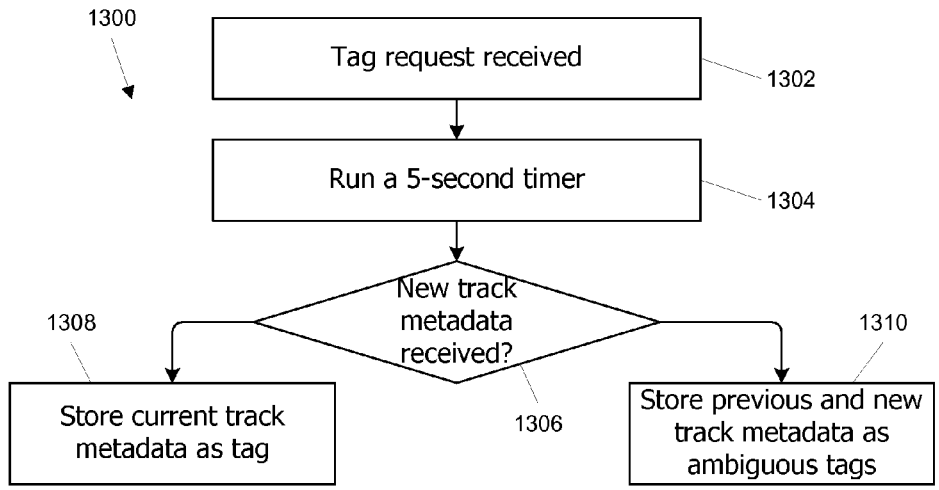
FIGS. 13A and 13B are flow diagrams of processes that an accessory can use to identify ambiguous requests for tags according to an embodiment of the present invention.
Figure 13B:
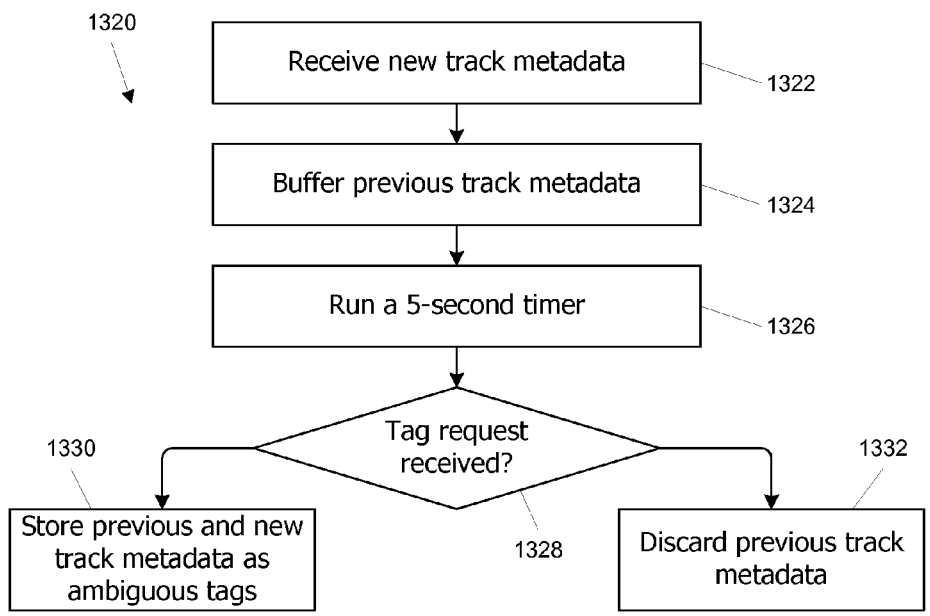

In some embodiments, when an ambiguous request is received, accessory 104 can capture any and all possibly correct tags. For example, FIGS. 13A and 13B are flow diagrams of processes 1300 and 1320 that an accessory can use to identify ambiguous requests based on the transitional window for an HD radio broadcast according to an embodiment of the present invention. FIG. 13A describes steps related to determining whether a tag request occurs during the last five seconds of a track while FIG. 13B describes steps related to determining whether a tag request occurs during the first five seconds of a track.

Turning first to FIG. 13A, process 1300 can be used any time a tag is requested (step 1302). Once the tag is requested, a five-second timer is used (step 1304) to defer capturing of the tag long enough to allow detection of a change in the track metadata. At step 1306, at the end of five seconds, it is determined whether new track metadata was received. If not, it can be inferred that the metadata that was current when the tag was requested is unambiguously the desired metadata; accordingly, at step 1308, the current track metadata is stored as a tag.

If, however, new track metadata was received within five seconds after the tag was requested, then it is possible that the user intended to tag the new track rather than the track whose metadata was current when the tag was requested (referred to for present purposes as the "previous" track). Accordingly, at step 1310, a tag is created and stored for each of the previous track and the new track. Referring to FIG. 2, both tags can have their AmbiguousTag fields set to a value indicating that they are ambiguous with each other, and the tag for the previous track can have its ButtonPressed field set to indicate that its metadata was current when the request to tag a track was received.

Referring now to FIG. 13B, process 1320 can be used any time new track metadata is received (step 1322) before the immediately preceding track is tagged. At step 1324, the previous track metadata is buffered so that it will remain available to accessory 104. At step 1326, a five-second timer is used to defer removal of the previous track metadata long enough to allow detection of a tag request during the interval when such a request would be ambiguous. At step 1328, at the end of five seconds, it is determined whether a tag request was received after the new metadata was received. If not, then the previous track data is no longer needed and can be discarded (step 1332).

If however, a tag request is received within five seconds of receiving the new metadata, then it is possible that the user intended to tag the previous track rather than the new track (whose metadata was current when the user requested the tag). Accordingly, at step 1330, a tag is created and stored for each of the previous track and the new track. Referring to FIG. 2, both tags can have their AmbiguousTag fields set to a value indicating that they are ambiguous with each other, and the tag for the new track can have its ButtonPressed field set to indicate that its metadata was current when the request to tag a track was received.

In this embodiment, accessory 104 does not need to attempt to resolve the ambiguity. Both tags are recorded and eventually stored in a tag file in PMD 102. The user can be prompted to resolve the ambiguity, e.g., when the tag file is read by a media asset management and/or delivery system.

Access to Tagged Media

Once a tag file has been written and closed, the tag file can be accessed later by various accessories or devices connected to PMD 102, thereby allowing a user to review and optionally purchase the tagged tracks. In one embodiment, as shown in FIG. 1D, PMD 102 can be connected to host computer 170 which provides access to a media asset management and/or delivery service (e.g., the iTunes™ media management and delivery service provided by Apple, Inc. or other existing media asset management and/or delivery services). Host computer 170 can be programmed such that during a synchronization operation that synchronizes PMD 102 to the media asset management system, host computer 170 automatically checks for and reads any new or updated tag files. The communication related to tag files may be managed using protocols similar to those used by host computer 170 to check for updates to other types of files (e.g., media files) that can be stored by PMD 102. Thus, the reading of tag files can be managed without introducing an additional lingo into the PMD's communication protocol. In some embodiments, stored tag files are removed from PMD 102 after being processed and stored by host computer 170. The tag information for a particular track may continue to be stored on host computer 170 as long as desired, e.g., until the user deletes the information or purchases the tagged track. In an alternative embodiment, PMD 102 can store tags in one or more tag files on its storage device 106; tag files can be stored indefinitely, e.g., until the user deletes the tags contained therein or purchases the tagged tracks.

Host computer 170 can locate tagged tracks within the media asset delivery system (e.g., within the iTunes™ Store) and prompt the user to purchase any or all of the tagged tracks. For example, host computer 170 can present the user a "playlist" of tagged tracks as read from storage device 106 on PMD 102. (A "playlist" in this context refers generally to a listing of metadata about tracks.)

FIG. 14 illustrates tag playlist 1400 according to an embodiment of the present invention. Tag playlist 1400 includes various attributes of the tagged track, such as track name, artist, album, genre, and date tagged (which may also include the time of day, although this is not explicitly shown). Some of the information in tag playlist 1400 (e.g., date tagged) can be extracted from the tags. Other information (e.g., genre) can be retrieved from the media asset delivery system. Track name, artist and album fields can be extracted from the tags or retrieved from the media asset delivery system, e.g., using a track identifier included in the tag. It is to be understood that the track attributes listed in FIG. 14 are illustrative and not limiting.

In some embodiments, some or all of the attributes of the tags can be clickable links to additional content related to the tagged track. For example, clicking on either instance of "Artist1" in tag playlist 1400 may cause host computer 170 to display a page listing information about and/or additional tracks by Artist1. The user can also sort tag playlist 1400 by any of the listed attributes, e.g., by clicking on the appropriate column header.

Tag playlist 1400 can also include action buttons or other interface elements via which a user can interact with the tagged tracks. For example, actuating "Preview" button 1402 can cause a preview portion of the track to be played. Actuating "Buy" button 1404 can initiate a purchase process for purchasing the tagged track from a media asset delivery service (e.g., media asset delivery service 178 of FIG. 1D). Actuating "List" button 1406 can add the tagged track to a list of tracks the user desires to own; such a list may be maintained by media asset delivery service 178 and made accessible to other users thereof. Actuating "Share" button 1408 can cause the tag information or the tag playlist entry to be shared with other users; for example, in response to actuating Share button 1408, a dialog box may open, prompting the user to identify the user(s) with whom the information is to be shared. "Delete" button 1410 can cause the tag to be deleted from the tag playlist. (If the tagged track is stored on host computer 170 and/or PMD 102, the track is not deleted.) Tag playlist 1400 can also include "Buy All" button 1412, which can be actuated to indicate the user's desire to purchase all of the tracks on tag playlist 1400. It is to be understood that more or fewer user interaction options may be supported. Some or all of the interaction items may be accessed via other control elements (e.g., keystrokes), and the use of buttons as depicted is not required.

In one embodiment, each tag file can be a separate playlist and different tag files can be identified, e.g., by date of creation. In another embodiment, all of the user's tagged tracks are presented in a single playlist; any duplicate tracks can be removed or visibly marked as being duplicates. The user can review the playlist and can choose to save the list, delete any or all of the tracks from the list, and/or purchase any or all of the tracks, e.g., from the media asset delivery system.

In some embodiments, the playlist can also visually highlight any instances where tags were identified as being ambiguous with each other (e.g., tags where the AmbiguousTrack value of FIG. 2 has been set to indicate ambiguity) and the user can be prompted to select the track that he intended to tag. To assist the user in making this determination, the playlist may also include an indicator as to which track was considered current when the ambiguous request was made; this information can be obtained, e.g., from the Button- Pressed field of FIG. 2. The user can then identify and delete the unintended tag. In some embodiments, the user might also have the option to keep both of the ambiguous tags; if the user selects this option, then the ambiguity flags can be removed from both tags.

Tag playlists can be created by host computer 170 interacting with a media asset delivery service (e.g., media asset delivery service 178 of FIG. 1D). In other embodiments, such as where PMD 102 can communicate with a media asset delivery service without connecting via a host computer (see, e.g., FIG. 1F), PMD 102 can create and display tag playlists on its own display device; a host computer is not required to create or view tag playlists.

Figure 15:
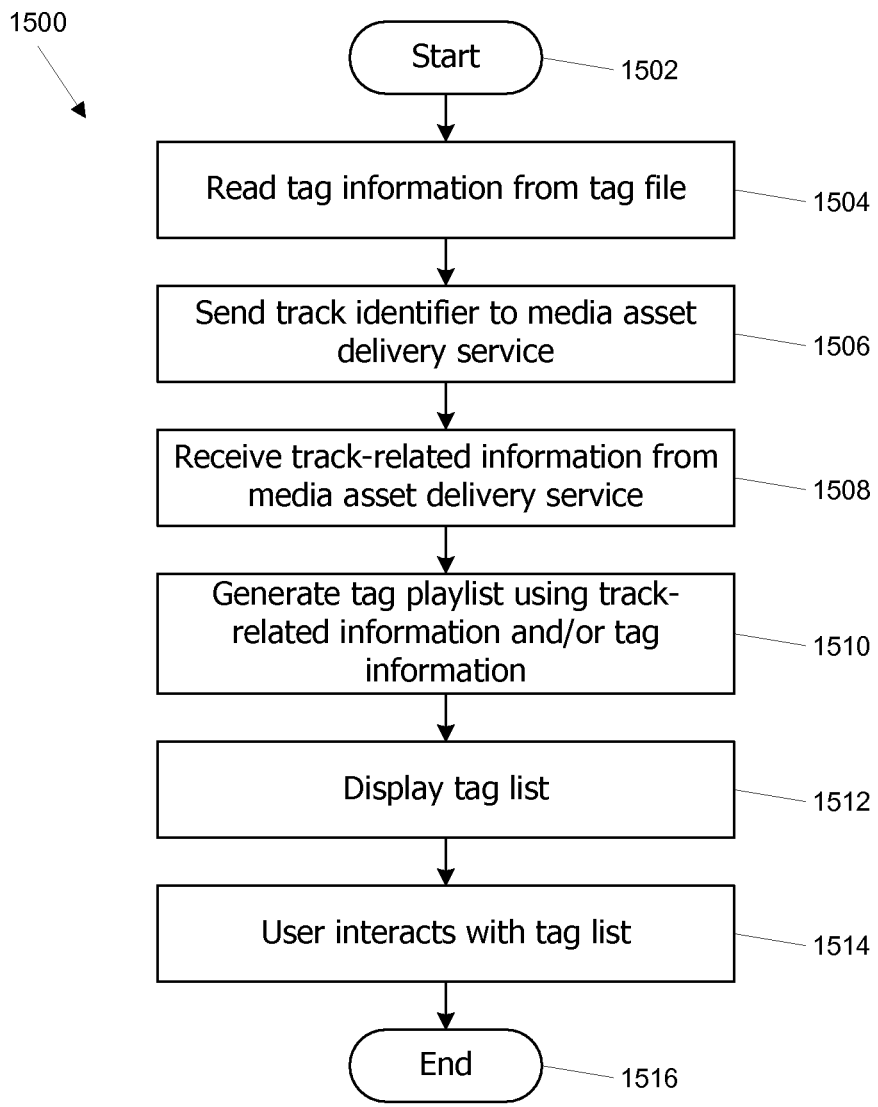
FIG. 15 is a flow diagram of a process that can be used to generate a tag playlist according to an embodiment of the present invention.

FIG. 15 is a flow diagram of process 1500 that can be used by a controller (e.g., a microcontroller or microprocessor executing suitable program code) of PMD 102 or host computer 170 to generate tag playlist 1400 according to an embodiment of the present invention. Process 1500 can begin (step 1502) automatically (e.g., when tag files are transferred to host computer 170) or in response to a user request for a listing of tagged tracks. At step 1504, the controller reads a tag file, which may be a newly received tag file from PMD 102 or a tag file that was previously received and stored by host computer 170. For each tag in the tag file, a unique track identifier (e.g., corresponding to the TrackIdentifier metadata field of FIG. 2) is extracted at step 1506. At step 1508, the controller can communicate the TrackIdentifier to media asset delivery service 178. Media asset delivery service 178 uses the TrackIdentifier to retrieve track-related information (e.g., track name, artist, etc.), and delivers the track-related information to the controller at step 1510.

Track-related information can include, e.g., information such as track name, artist name, album name, genre or any other information that media asset delivery service 178 stores regarding a track. Track-related information can also include additional information. In some embodiments, media asset delivery service 178 may provide a uniform resource locator ("URL") or other information that can be used to link particular fields in a tag playlist entry to related content. Thus, for example, an artist's name can be associated with a URL of a page that lists tracks by that artist that are available for purchase via media asset delivery service 178. In other embodiments, track-related information can include instructions and/or content associated with some or all of the action buttons of tag playlist 1400 for the track. Thus, for example, the track-related information can include instructions to be executed to complete the purchase of the track if the user actuates "Buy" button 1404, other information related to purchasing the track (e.g., price of the track), or the content of a preview portion of the track that is to be played if the user actuates "Preview" button 1402.

At step 1512, the controller generates a tag playlist using the track-related information received at step 1510. At step 1514, the controller presents the tag playlist to a user, e.g., by displaying the list on a display device. This display device can be, e.g., a component of host computer 170 or PMD 102. At step 1516, the user can interact with tag playlist 1400, e.g., to preview, buy, or share tracks or the like. At step 1518, process 1500 ends.

It will be appreciated that the tag playlist and process described herein are illustrative and that variations and modifications are possible. Steps described as sequential may be executed in parallel, order of steps may be varied, and steps may be modified or combined. For example, in some embodiments, the controller executing process 1500 can send a separate request for track-related information for each track identifier or can send separate requests for particular types of track-related information; in other embodiments, a single request can include multiple track identifiers. In some embodiments where PMD 102 digitally signs tags or tag files, host computer 170 can read the digital signature(s) associated with the tags or tag file and verify data integrity; tags that do not pass the verification test can be excluded from the playlist. Host computer 170 can alert the user if tags are rejected. In still other embodiments, host computer 170 or PMD 102 can deliver tag files to media asset delivery service 178; media asset delivery service 178 can store the tag files (or portions thereof) for the user and can generate tag playlists for delivery to host computer 170 or PMD 102 in response to a user request.

In some embodiments, reading the tag file may include error checking and/or data integrity verification. For example, as noted above, tags can be digitally signed by PMD 102 when they are written to the tag file; reading the tag file can include verifying the digital signature to make sure the tag data has not been altered or corrupted.

Tag playlists may include any combination of elements including but not limited to those described herein. In some embodiments, some elements might be present or not on a per-entry basis. For example, if a tagged track is not available via the media asset delivery system or if the user already owns the tagged track, a buy option might not be enabled, but the track can still be listed. Additional options for tag lists and user interaction with tag lists are described in above-referenced U.S. patent application Ser. No. 11/210,172 (U.S. Patent App. Pub. No. 2006/0235864 A1).

Figure 16:
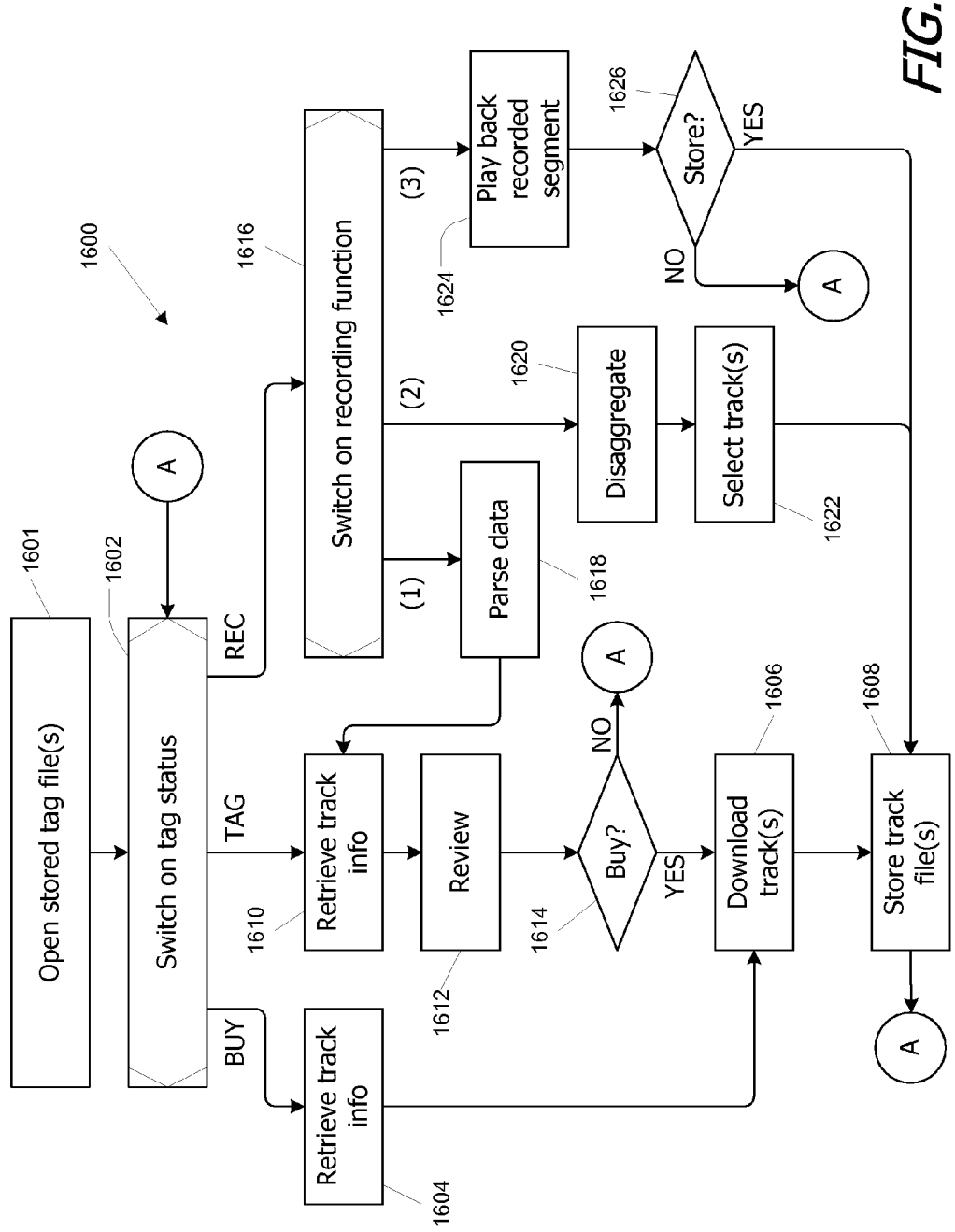
FIG. 16 is a flow diagram illustrating user interactions with a media asset management and delivery system in accordance with one embodiment of the present invention.

The user can interact with tag information and a media asset delivery service (e.g., media asset delivery service 178 of FIG. 1D) in a number of ways to learn about and acquire tagged media assets. FIG. 16 is a flow diagram of process 1600 illustrating user interactions with a media management and delivery system, e.g., similar to iTunes™, in accordance with one embodiment of the present invention. Although any one or more of the steps of process 1600 can be initiated and performed by a controller (e.g., microcontroller or microprocessor executing suitable program code) of PMD 102 of FIG. 1A or by host computer 170, accessory 104 may also include circuitry that would enable accessory 104 to perform one or more of the following steps.

In step 1601, a controller in PMD 102 or host computer 170 can open stored tag files (which may have been created as described above). In step 1602, the controller can determine the tag status of each stored tag (e.g., whether the tag corresponds to the BUY function, TAG function or REC function described above with reference to FIG. 8). If a tag corresponds to the BUY function (e.g., if a buy indicator is set as described above), then in step 1604, the controller can retrieve the indicated media asset from the media asset delivery service through the network. In step 1606, the controller can download the retrieved media asset into a storage medium disposed in PMD 102, accessory 104, and/or host computer 170. In some embodiments, downloading the media asset can include transmitting to the media asset delivery service an affiliate identifier (FIG. 2) associated with the tag. The media asset delivery service can use the affiliate identifier to credit the broadcast partner that made the tag information available to the user; for example, the broadcast partner may receive a portion of the purchase price for each tag that leads to a sale of a tagged track.

Once downloaded, the media files can be stored (step 1608), and process 1600 can return to point A to process additional tags.

If the controller determines in step 1602 that one or more of the tags correspond to the TAG function (e.g., the buy indicator is not set), the controller can retrieve the corresponding media asset(s) and/or asset-related information from the media asset delivery service in step 1610. In step 1612, the controller can permit the user to review at least a portion of the retrieved asset(s) or related information. In one embodiment, retrieved assets can be presented as a playlist similar to other playlists employed by iTunes™ and the iTunes™ Store. Thus, for example, the playlist can provide controls via which the user can preview a portion of the track, access information about the artist and/or album, purchase the track, and so on.

At step 1614, the controller can determine whether the user wishes to purchase any of the retrieved assets. If not, then the controller can return to point A in the flowchart to process additional tags. If the user does wish to purchase one or more of the retrieved assets, the controller can download the desired assets into a storage medium disposed in PMD 102, accessory 104, and/or host computer 170 (step 1606). Once downloaded, the controller can store the media file(s) in step 1608 and return to point A to process additional tags.

If the controller determines in step 1602 that one or more of the tags correspond to the REC function (in which case the stored files would include at least one recorded broadcast), the controller can perform one or more of the following functions—(1) purchase individual audio tracks identified in the recorded broadcast segment, (2) disaggregate the recorded broadcast segment into individual segments, or (3) playback the entire recorded broadcast segment. In one embodiment of the present invention, the controller can permit the user to select the function he or she wants to initiate. At step 1616, the user selects a function, and the controller can detect the selection and take the appropriate action.

For function (1), the controller can parse the recorded broadcast data in step 1618 by extracting identification information about the media tracks within the recorded broadcast. The recorded broadcast can be stored as a single file or as multiple files (e.g., as a media content file and an associated file with corresponding identification information). Once identification information has been extracted, the controller can perform steps 1610-1614 and 1606-1608 as described above.

For function (2), the controller can disaggregate the recorded broadcast data in step 1620. That is, the controller can use data encoded in the recorded radio broadcast data to splice the recorded broadcast into individual segments. The controller can then present each individual recorded segment to the user, e.g., as a playlist similar to that employed by iTunes™. The controller also can present information about each individual segment using identification information extracted from the recorded radio transmission. Because the individual segments presented to the user are derived from the recorded broadcast, the user may not have to purchase the audio tracks. Thereafter, in step 1622, the controller can permit the user to select one or more individual audio segments. The controller can then store the selected segments in step 1608.

For function (3), the controller can playback the entire recorded radio broadcast segment in step 1624. Thereafter, in step 1626, the controller can permit the user to store the recorded radio broadcast segment in its entirety. If the user does not want to store the recorded broadcast, the controller can return to point A to process additional tags.

Once tag processing is completed (e.g., the user closes a window or navigates away from the playlist(s) of tagged tracks), the process of FIG. 16 may end. As noted above, the tags may continue to be stored indefinitely, and the user can access and interact with the stored tags using the same process at different times. In some embodiments, tags are automatically removed from the stored tag files once the user buys the track; the user may also have the option to delete a tag without purchasing the track.

It will be appreciated that the user interaction process described herein is illustrative and that variations and modifications are possible. Steps described as sequential may be executed in parallel, order of steps may be varied, and steps may be modified or combined. Functions other than those described above may be supported. For instance, the user may be able to interact with a list of tagged tracks to obtain related information, e.g., by browsing the catalog of the media asset delivery service using one or more of the tagged tracks as a starting point. The user can also delete tags, view and sort the list of tags, and so on. A "buy all" option, e.g., as described above, may also be supported. In some embodiments, the user can also download a free version of a media track in addition to or instead of buying the track. The free version may include, for example, the track content along with one or more advertisements, or the free version may have lower resolution than a purchasable version of the track, or it may include only a portion of the content. In some instances, some or all media tracks may be distributed without charging the user; for instance, a user may pay a flat monthly fee for unlimited downloads, or some tracks may be offered for free on a promotional basis. Thus, references to purchasing or buying a track herein should be understood as including the case where the user does not pay to acquire a particular track.

Figure 17:
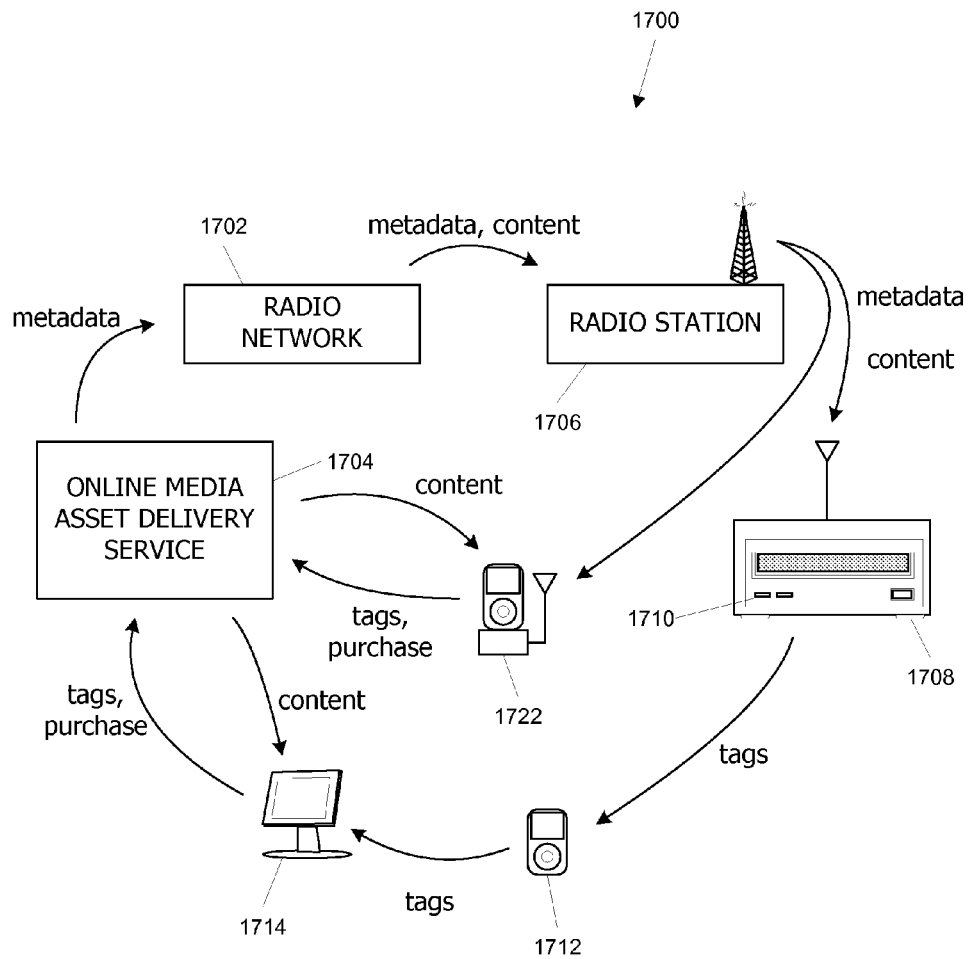
FIG. 17 is a diagram of a media communication system incorporating tagging features according to an embodiment of the present invention.

FIG. 17 is a diagram of media (e.g., HD radio) communication system 1700 incorporating tagging features according to an embodiment of the present invention. In system 1700, HD radio network 1702 can be an affiliate of online media asset delivery service 1704 (which can be an Internet-based service such as iTunes™). Media asset delivery service 1704 can provide affiliated radio network 1702 with metadata that can be embedded in HD radio broadcasts. The metadata may include per-track metadata (e.g., an identifier of the track that maps to the internal identifiers used by media asset delivery service 1700) and track-independent metadata, such as an identifier that identifies radio network 1702 as an affiliate of media asset delivery service 1704. Radio network 1702 can provide this metadata, along with content (e.g., tracks) to its member radio stations 1706. In turn, member radio stations 1706 can broadcast the content along with the metadata, e.g., using HD radio technology.

A user can operate HD radio receiver 1708 to receive the content and metadata from radio station 1706. Receiver 1708 can be, e.g., an embodiment of accessory 104 or accessory 104 described above. Thus, receiver 1708 can extract the metadata from a received broadcast and create tags for any or all of the tracks, e.g., in response to user operation of a control button 1710.

Receiver 1708 can be configured to communicate the tags it creates to PMD 1712 at such times as PMD 1712 is connected to receiver 1708, as described above (e.g., by writing one or more tag files to PMD 1712). PMD 1712 can be, e.g., an embodiment of PMD 102 or PMD 102 described above. In some embodiments PMD 1712 may be equipped with hardware and/or software based security features so that only authorized receivers 1708 are capable of writing data to PMD 1712. For example, the command protocol may include authentication commands by which PMD 1712 can determine whether receiver 1708 is an authorized receiver, and PMD 1712 may reject any or all of the storage lingo commands unless receiver 1708 is properly authenticated. Such security measures can protect PMD 1712 and data stored thereon from malicious tampering or accidental damage. In addition, PMD 1712 can sign each tag file created by receiver

1708, e.g., using conventional digital signature techniques, thus protecting the integrity of the tag data provided by receiver 1708. For example, in embodiments where each tag is stored in a separate file, PMD 1712 can generate the digital signature before writing the tag file; this can help to ensure that the stored tag file contains the tag as received by PMD 1712.

After receiving the user's tags from receiver 1708, PMD 1712 can be connected to host computer 1714. Host computer 1714 can read the stored tags from PMD 1712 and produce a playlist of the user's tagged tracks. Host computer 1714 can also use the digital signature on the tag files to verify that the tags originated from an authenticated receiver and/or as a check on data integrity.

The transfer of tags from receiver 1708 to PMD 1712 and the transfer of tags from PMD 1712 to host computer 1714 can be fully automated; that is, receiver 1708 can automatically detect when PMD 1712 is connected thereto and can automatically transfers the tags (including any accumulated tags) whenever a connection is detected. Similarly, PMD 1712 can automatically transfer stored tags to host computer 1714 whenever PMD 1712 synchronizes with host computer 1714. Thus, the user is able to conveniently and almost effortlessly collect and review tags for broadcast tracks.

Host computer 1714 can be further connected to communicate with media asset delivery service 1704 (e.g., via the Internet). For example, host computer 1714 can provide the tag information to media asset delivery service 1704, allowing media asset delivery service 1704 to offer the user an opportunity to purchase any or all of the tagged tracks. If the user chooses to buy a track, media asset delivery service 1704 can deliver the track to host computer 1714 (e.g., via the Internet). Host computer 1714 can further deliver the track (not explicitly shown) to PMD 1712.

System 1700 can also include another PMD 1722 capable of receiving media broadcasts including metadata and content from radio station 1706. For example, PMD 1722 can be configured with a portable receiver accessory as shown in FIG. 1E. PMD 1722 can also be configured to communicate wirelessly with online media asset delivery service 1704. For example, PMD 1722 can be configured with WiFi or other wireless technologies usable to communicate with a wireless access point connected to the Internet, and media asset delivery service 1704 can also be connected to the Internet. PMD 1722 can communicate tags and purchase requests to media asset delivery service 1704 in real time (e.g., as the user operates a control to indicate interest in tagging and/or purchasing a track), and a user can obtain information about a track and/or purchase the track without waiting to synchronize with a host computer system.

Thus, a user of PMD 1712 or PMD 1722 is provided with options for obtaining music, TV programming and other media content in which the user has indicated an interest.

A proprietor of media asset delivery service 1704 can generate revenue by selling media tracks, including tagged tracks. While a tagged track can be identified in a variety of ways (e.g., by reference to broadcasters' playlists, analysis of sound samples, or matching of metadata such as track name and artist name to track information stored in a database of media asset delivery service 1704), more reliable identification can be achieved if the tag includes a unique track identifier used by media asset delivery service 1704. As incentive to broadcasters and/or other entities involved in collecting tags to include these unique track identifiers in the metadata and tags extracted therefrom, the proprietor of media asset delivery service 1704 can offer incentives.

For example, as noted above, the tag metadata can include an affiliate identifier assigned to a particular broadcaster (e.g., radio station 1706). The broadcaster can include the affiliate identifier along with the unique track identifier in metadata broadcast in association with media content. When a track is tagged, the tag information returned to media asset delivery service 1704 can include the affiliate identifier. If the user purchases a tagged track, media asset delivery service 1704 can use the affiliate identifier to determine which broadcaster was the source of the tagged broadcast and provide an appropriate reward, e.g., a portion of the purchase price of the track.

An affiliate rewards program can also be extended to other points in system 1700. For example, metadata associated with a broadcast track can identify a creator or distributor of the track (e.g., radio network 1702), and this identification can be the basis for making rewards payments to creators or distributors whose content is purchased. As another example, an accessory that facilitates tagging (e.g., accessory 1708 or 1722) can include in the tag information identifying the manufacturer of the accessory. This information can also be propagated to media asset delivery service 1704 and used to provide rewards to makers of accessories that are used for tagging activities that result in a purchase.

Media asset delivery service 1704 may also provide access to other information associated with a tagged track. For instance, the user may be able to preview a portion of the tagged track, access a free version of the track (e.g., with embedded advertising content or reduced quality), or the like.

It will be appreciated that system 1700 is illustrative and that variations and modifications are possible. For example, while system 1700 refers to radio and to HD radio, similar systems can be constructed around other types of media (e.g., video) and media delivery channels (e.g., satellite, cable, Internet, wireless media etc.). In general, system 1700 can include any number of broadcasters broadcasting various types of media, and any number of media receivers and media devices can be capable of receiving such broadcasts and/or communicating with a media delivery service to obtain tagged media assets and/or associated information.

In some embodiments, media asset delivery service 1704 can aggregate information about tagged content across a number of users who communicate tags to media asset delivery service 1704. Such information can be used in a variety of ways. For example, media asset delivery service 1704 can generate a list of the most frequently tagged tracks over a given time interval (e.g., a week). Lists can be broken out by media type (e.g., music, video, books, podcasts), genre, artist or performer, or the like. In addition, to the extent that media asset delivery service 1704 has access to demographic information about individual users, that information can further be used to generate lists of popular tracks among certain segments of the user base.

Aggregate information about users' tagging behavior can be used by media asset delivery service 1704 to entice users to buy additional media assets. For instance a "Hot" list of the week's most tagged tracks can be presented when a user connects to service 1704. Demographic information can be used to recommend tracks that might be of interest based on what users in similar demographic groups have tagged. In another embodiment, if a user has tagged a first track, other tracks tagged by other users who also tagged the first track might be recommended.

In another embodiment, media asset delivery service 1704 can collect information about tags that do not match content provided by media asset delivery service 1704. Such tags may correspond to tracks that are not available for purchase or free download from media asset delivery service 1704. By tracking these "misses," media asset delivery service 1704 can identify popular tracks that are missing from its catalog, and a proprietor or manager of media asset delivery service 1704 can use this information in determining whether to acquire a particular track. For instance, it can be inferred that tracks that are more frequently tagged are more likely to sell well.

In another embodiment, to the extent that tags include information about the accessory and/or PMD used to create the tags, media asset delivery service 1700 can also aggregate information about the products that are being used for tagging. This information can be used in marketing of accessories or PMDs or the like, e.g., by identifying popular accessories in the context of tagging.

Sharing Tags

In some embodiments, a user can share tags with one or more other users, automatically or manually. In one embodiment, a user can create a list of people with whom his or her tags should automatically be shared. Each time a user tags a media track, the user's device can share that tag with one or more people on the list. Each list or person on the list can be associated with parameters that define the types of tags to be shared with that person or list of people (e.g., by media type, genre, artist/performer, etc.). A user can also select people to receive a particular tags. Tags can be shared, for instance, using e-mail (e.g., with an XML tag file as an attachment); instant messaging; short messaging service ("SMS," also known as texting); messaging via a peer-to-peer or network; or the like. If the user's PMD on which a tag is stored is configured to communicate via a suitable network (e.g., the Internet or mobile phone network), the user can send tags to other users directly from his or her PMD. Similarly, a user can also receive a tag directly onto his or her PMD. Alternatively, a host computer can be used to send tags (e.g., via e-mail or instant messaging) after the tags have been transferred from a PMD.

As described above, tags can also be shared among users who are parties to a telephone call. Like other tags, a shared tag may include any combination of data elements that can be used to identify the track and/or the broadcaster; in some embodiments, a shared tag may also include a preview portion of the tag content (or a link to a location from which the preview portion is available).

In other embodiments, a user can publish a list of tags. For instance, online media asset delivery service 1704 of FIG. 17 can permit users to upload playlists, which then become visible to other users of service 1704. (The other user can see the playlist but would need to purchase the tracks, unless he or she already owns them, before actually playing the list.) In accordance with an embodiment of the present invention, a user's uploaded playlist can include tracks he or she has tagged, regardless of whether he or she has purchased the tracks. Other users can access the uploaded playlist and, if they so choose, purchase the tracks.

In other embodiments, a user can generate tags for media tracks already stored in the media library of his or her PMD(s) (or other devices) and share those tags with others. Like media broadcast tags, the media library tags can be shared with others by sending the tags using, for example, a telephone and/or internet network. The tags can be shared with a user-defined list of people or with one or more people designated by the user in real-time (e.g., during a telephone call). For example, a user can send media library tags or previously generated media broadcast tags to a media broadcaster as media requests.

In embodiments where users can share tags, the tag data received by the recipient of a shared tag may include a referral identifier that identifies a user who was the source of a tag. When a user who receives a shared tag connects to media asset delivery service 1704 and purchases the tagged asset, media asset delivery service 1704 can award credits to the referring user. These credits can be the basis for rewarding users who share their tags with others and encourage those others to buy the tagged tracks. In one example, a user whose shared tags result in a threshold number of purchases by other users might be rewarded with a free download of a media asset, cash payment, or other incentive.

Further Embodiments

While the invention has been described with respect to specific embodiments, one skilled in the art will recognize that numerous modifications are possible. For instance, the commands and event sequences used to store tags might be different from the particular commands and event sequences described herein. In some embodiments, additional commands, such as commands allowing the accessory to read back data written to an open file, could be added. The sequences of commands used to store tags in tag files might be varied.

In addition, tags can be applied to any type of broadcast including but not limited to musical tracks, spoken-word tracks, video broadcasts, podcasts, advertisements, still images, and so on. Any identifying information associated with broadcast content may be included in a tag for that content, and tags may be stored in any format desired.

The protocols and file formats described herein can be used with a wide range of PMDs and/or accessories; for example, the PMD could have additional functionality such as the ability to make and receive telephone calls, voice recorder capability, personal information management capability (e.g., calendar, contacts list, e-mail, etc.). Further, in some embodiments, some or all of the functionality described in connection with an accessory could also be part of a PMD. For example, the PMD might be configured to extract tag information from broadcast content, or a receiver could be packaged with a PMD (e.g., inside the same housing) and sold as a unit.

In embodiments where the PMD includes an integrated receiver (e.g., as shown in FIG. 1F), the PMD can extract the tag information from the received broadcast. In embodiments where the PMD is connected to a network, the PMD can communicate tag information to a media asset delivery service immediately upon receipt thereof. Thus, in some embodiments, as a user is listening to a broadcast track that is taggable, the user can operate a user input control of the PMD to store the tag information and/or immediately purchase the track. To store tag information, the PMD can write the information to a tag file, e.g., as described above. To purchase the track, the PMD can forward a purchase request including the tag information to the media asset delivery service via the network; the track can then be downloaded from the media asset delivery service to the PMD via the network.

Embodiments of the present invention can be applied to a wide variety of media types, including music, spoken word (e.g., audio books, lectures), video (e.g., television, movies), still images, and others. Any broadcast medium may be used to transmit taggable media content, and any type or combination of asset-identifying information can be included in a tag.

Embodiments of the present invention can be realized using any combination of dedicated components and/or programmable processors and/or other programmable devices. While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible device or provided separately from other devices (e.g., via Internet download). Program code may also be encoded and transmitted using carrier signals adapted for transmission via wired, optical, and/or wireless networks conforming to a variety of protocols, including the Internet.

Thus, although the invention has been described with respect to specific embodiments, it will be appreciated that the invention is intended to cover all modifications and equivalents within the scope of the following claims.

What is claimed is:

1. A method performed by an accessory communicably coupled to a portable media device ("PMD"), wherein the accessory and the PMD are separate electronic devices, the method comprising:
   receiving, by the accessory, broadcast data including a first track;
   determining, by the accessory, whether the first track is to be tagged; and
   in response to determining that the first track is to be tagged:
      capturing, by the accessory, identifying information for the first track from the broadcast data;
      obtaining, by the accessory, a metadata item associated with the first track from a source other than a source of the received broadcast data;
      generating, by the accessory, a first tag comprising the identifying information for the first track and the metadata item; and
      instructing, by the accessory, the PMD to store the first tag in a storage medium of the PMD.

2. The method of claim 1 wherein determining whether the first track is to be tagged includes receiving an instruction to tag the first track.

3. The method of claim 1 wherein the first tag includes a plurality of metadata items descriptive of the first track.

4. The method of claim 3 wherein the plurality of metadata items descriptive of the first track includes one or more items selected from a group consisting of a track name, an artist or performer name, an album name, a time stamp, a track identifier associated with the track, and a program type for the first track.

5. The method of claim 1 wherein the first tag includes a plurality of metadata items descriptive of a broadcaster of the first track.

6. The method of claim 5 wherein the plurality of metadata items descriptive of the broadcaster includes one or more items selected from a group consisting of a station identifier of the broadcaster, a market area associated with the broadcaster, a network or group with which the broadcaster is affiliated, and a uniform resource locator (URL) associated with the broadcaster.

7. The method of claim 1 wherein receiving the broadcast includes:
   receiving a plurality of metadata fields associated with the first track.

8. The method of claim 7 wherein generating the first tag includes:
   populating an XML dictionary with a plurality of key-value pairs, each key-value pair corresponding to one of the plurality of metadata fields.

9. The method of claim 8 wherein populating the XML dictionary includes:
   including in the XML dictionary a key-value pair for which the key identifies the corresponding metadata field as an unrecognized metadata field.

10. The method of claim 1 where the first tag includes a representation of a portion of the content of the first track.

11. The method of claim 1 wherein the source of the received broadcast data is a media broadcasting station and the source of the at least one metadata item is a data network.

12. The method of claim 11 wherein the media broadcasting station is a radio station.

13. The method of claim 11 wherein the media broadcasting station is a television station.

14. The method of claim 1 further comprising:
   displaying information about the first track.

15. The method of claim 14 wherein displaying the information about the first track includes displaying the information on a display device of the accessory.

16. The method of claim 14 wherein displaying the information about the first track includes providing displayable information about the first track to the PMD, wherein the PMD displays the displayable information on a display device.

17. The method of claim 14 wherein the displayed information includes at least some of the information that is included in the first tag in the event that the first tag is generated.

18. The method of claim 14 wherein the displayed information includes an indication of whether the first track is a taggable track.

19. The method of claim 14 wherein determining whether the first track is to be tagged includes:
   receiving, while the information about the first track is displayed, a signal indicative of a request from a user to generate a tag.

20. The method of claim 1 wherein the act of generating the first tag is performed at a time when the accessory is not coupled to the PMD, the method further comprising:
   storing the first tag in a local storage medium of the accessory,
   wherein the act of instructing the PMD to store the first tag is performed at a later time when the accessory is coupled to the PMD.

21. The method of claim 20 further comprising:
   during the time when the accessory is not coupled to the PMD, generating at least one additional tag, wherein each additional tag is associated with a different one of a plurality of tracks of the broadcast data;
   storing each of the additional tags in the local storage medium of the accessory; and
   during the time when the accessory is coupled to the PMD, instructing the PMD to store each of the additional tags in the storage medium of the PMD.

22. An accessory comprising:
   a receiver component configured to receive a broadcast including one or more tracks;
   a tag extraction engine configured to capture a tag comprising information related to a track from the one or more tracks;
   an interface configured to communicate the captured tag from the tag extraction engine to a portable electronic device (PMD), wherein the accessory and the PMD are separate electronic devices, wherein the PMD is configured to store the tag in a storage medium and the interface is adapted to instruct the PMD to open a tag file in the storage medium prior to communicating the captured tag to the PMD; and communication circuitry configured to obtain a metadata item associated with the track from a source other than a source of the received broadcast and communicate the metadata item to the PMD via the interface.

23. The accessory of claim 22 further comprising:

a user input component adapted to receive a user input indicating that a current track of the broadcast should be tagged, wherein the tag extraction engine is further adapted to capture a tag comprising information related to the current track in response to the user input.

24. The accessory of claim 22 wherein the tag extraction engine is further configured to capture, as part of the tag, metadata received with the track.

25. The accessory of claim 22 wherein the tag extraction engine is further configured to capture, as part of the tag, a portion of the broadcast data of the track.

26. The accessory of claim 22 wherein the interface is also configured to receive a response from the PMD indicating that the tag file is open.

27. A method performed by an accessory communicably coupled to a portable media device ("PMD"), wherein the accessory and the PMD are separate electronic devices, the method comprising:

receiving, by the accessory, broadcast data including a plurality of tracks and metadata associated with each of the plurality of tracks;

during receiving of the broadcast data, receiving, by the accessory, an instruction to tag a currently playing track from the plurality of tracks; and in response to the receiving the instruction to tag:

capturing, by the accessory from the broadcast data, metadata for at least one track from the plurality of tracks;

obtaining, by the accessory, additional information about the at least one track from a source other than a source of the broadcast data;

generating, by the accessory, a tag comprising the metadata and the additional information;

sending, by the accessory, a first command to the PMD, the first command requesting information about storage capabilities of the PMD;

receiving, by the accessory, a second command from the PMD in response to the first command, the second command including information about the storage capabilities of the PMD;

sending, by the accessory, a third command to the PMD in response to the second command, the third command requesting the PMD to open a file for writing tags;

receiving, by the accessory, a fourth command from the PMD in response to the third command, the fourth command including a handle for an opened file; and sending, by the accessory, a fifth command to the PMD in response to the fourth command, the fifth command instructing the PMD to add the tag to the opened file.

28. The method of claim 27 wherein the second command received by the accessory comprises one or more of the following: a total size of an internal storage medium of the PMD, largest allowed file size; maximum amount of data that can be written the internal storage medium of the PMD using a single command, and version information identifying the version of a storage lingo supported by the PMD.

29. The method of claim 27 wherein the third command further comprises a purpose of the file.

30. The method of claim 27 wherein the handle remains valid until either the accessory is no longer coupled to the accessory or the accessory closes the opened file.

31. The method of claim 27 wherein the fifth command sent by the accessory comprises one or more of: the handle, an offset, and data.

* * * * *